US008738487B1

(12) United States Patent
Schmidt et al.

(10) Patent No.: US 8,738,487 B1
(45) Date of Patent: May 27, 2014

(54) APPARATUS AND METHOD FOR PROCESSING DATA

(75) Inventors: Edward Schmidt, New York, NY (US); Dan Cioaca, New York, NY (US); Alexander D. Stein, Bedford Hills, NY (US); Nyla H. Ibrahim, West Nyack, NY (US); Matthew Jacobus, Brooklyn, NY (US)

(73) Assignee: Two Sigma Investments, LLC, New York, NY (US)

( * ) Notice: Subject to any disclaimer, the term of this patent is extended or adjusted under 35 U.S.C. 154(b) by 1063 days.

(21) Appl. No.: 12/190,922

(22) Filed: Aug. 13, 2008

Related U.S. Application Data

(60) Provisional application No. 60/955,744, filed on Aug. 14, 2007, provisional application No. 61/023,463, filed on Jan. 25, 2008.

(51) Int. Cl.
*G06Q 40/00* (2012.01)
(52) U.S. Cl.
USPC .......................................................... 705/35
(58) Field of Classification Search
CPC ........ G06Q 20/22; G06Q 20/29; G06Q 40/00

USPC .................... 705/1–99; 235/1–101; 709/1–99
See application file for complete search history.

(56) References Cited

U.S. PATENT DOCUMENTS

| 7,401,039 B1 * | 7/2008 | Lin et al. ..................... 705/36 R |
| 7,424,452 B2 * | 9/2008 | Feilbogen et al. .............. 705/37 |
| 7,539,637 B2 * | 5/2009 | Gatto .......................... 705/36 R |
| 2004/0225637 A1 * | 11/2004 | Heinzel et al. .................... 700/1 |

OTHER PUBLICATIONS

Todd Wittman, Time-Series Clustering and Association Analysis of Financial Data, Dec. 15, 2002, UCLA, web, 1-21.*

* cited by examiner

*Primary Examiner* — Marissa Liu
(74) *Attorney, Agent, or Firm* — RatnerPrestia

(57) ABSTRACT

Methods and apparatus for processing data. The apparatus includes a plurality of entry systems for receiving the data from a respective plurality of contributors which each formulate the data based on respectively different: a) input data, and b) rules for governing how the input data is used to formulate the data. The apparatus also includes a tracking system having a data normalizer configured to normalize the formulated data received from each of the plurality of contributors into a common format. The tracking system performs at least one comparison of the normalized data from the entry systems and signals results of the comparison.

42 Claims, 26 Drawing Sheets

| TICKER | LAST | TODAY'S CHANGE | SIZE M€ | OPEN DATE | NET K€ | NET % | NET ALPHA K€ | NET ALPHA % | POINTS |
|---|---|---|---|---|---|---|---|---|---|
| TOTAL | | | 24.3 | | (303) | (1.24) | 74 | 0.30 | (47) |
| GALP:PL | | | 1.7 | 08 FEB 2007 | 150 | 9.76 | 155 | 10.11 | 140 |
| LMI:LN | | | 1.3 | 19 JUL 2007 | (180) | (12.44) | 26 | 1.79 | (40) |
| BPVN:IM | | | 1.1 | 19 FEB 2007 | (326) | (21.48) | (185) | (12.15) | (219) |
| AB/:LN | | | (0.9) | 09 MAR 2007 | (131) | (17.14) | (128) | (16.82) | (118) |
| ASML:NA | | | (0.9) | 27 FEB 2007 | (127) | (16.85) | (67) | (8.84) | (82) |
| RHA:FP | | | 0.9 | 18 JAN 2007 | 87 | 11.32 | (10) | (1.33) | 21 |

APPARATUS AND METHOD FOR PROCESSING DATA

CROSS REFERENCE TO RELATED APPLICATIONS

This patent application claims the benefit of priority from U.S. Provisional patent application No. 60/955,744, filed Aug. 14, 2007 and provisional patent application No. 61/023,463, filed Jan. 25, 2008. The contents of each of which are incorporated herein by reference.

FIELD OF THE INVENTION

The present invention relates to data collecting and processing. In particular, the present invention relates to methods and apparatus for processing data from a plurality of entry systems where each system formulates the data differently.

BACKGROUND OF THE INVENTION

In general, investors make decisions about which marketable securities to invest in, how extensive the investments should be and when the investment is desirable. An investor may set an investment policy relating to investment objectives, such as risk and return, and amount of investable wealth of a particular individual. Typically, the investment policy identifies potential categories of financial assets that may be included in a portfolio. The investor may perform a security analysis on a number of individual securities in the identified financial assets categories. A portfolio may be constructed to select the assets in which to invest, based on the security analysis results. The construction may also take into account any selectivity (i.e. microforecasting), timing (macroforecasting) and diversification issues. The investor may additionally periodically revise the portfolio and evaluate the performance of the portfolio.

SUMMARY OF THE INVENTION

The present invention relates to methods and apparatus for processing data. The apparatus includes a plurality of entry systems for receiving the data from a respective plurality of contributors which each formulate the data based on respectively different: a) input data, and b) rules for governing how the input data is used to formulate the data. The apparatus also includes a tracking system having a data normalizer configured to normalize the formulated data received from each of the plurality of contributors into a common format. The tracking system performs at least one comparison of the normalized data from the entry systems and signals results of the comparison.

The present invention also relates to methods and apparatus for processing data. The apparatus includes a plurality of entry systems for receiving the data from a respective plurality of contributors and a tracking system. The tracking system includes a data analyzer configured to perform at least one comparison of the data from the corresponding entry systems and for signaling results of the comparison and an alert system configured to indicate at least one of a static alert, a dynamic alert and a further alert to one or more of the contributors. The static alert is associated with at least one of the contributors and is based on current data values, the dynamic alert is associated with at least one of the contributors and is based on historical data values, and the further alert is based on aggregate results determined by the data analyzer for the plurality of contributors.

BRIEF DESCRIPTION OF THE DRAWINGS

The invention may be understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover in the drawings, common numerical references are used to represent like features/elements. Included in the drawing are the following figures:

FIGS. 5A and 5B are example displays of the comparison of financial data by contributor, according to an embodiment of the present invention;

FIGS. 7A, 7B and 7C are example displays of financial data of contributors including alerts for signaling when the execution of instructions related to the financial data achieves a predetermined result, according to an embodiment of the present invention;

DETAILED DESCRIPTION OF THE INVENTION

Figure 1:
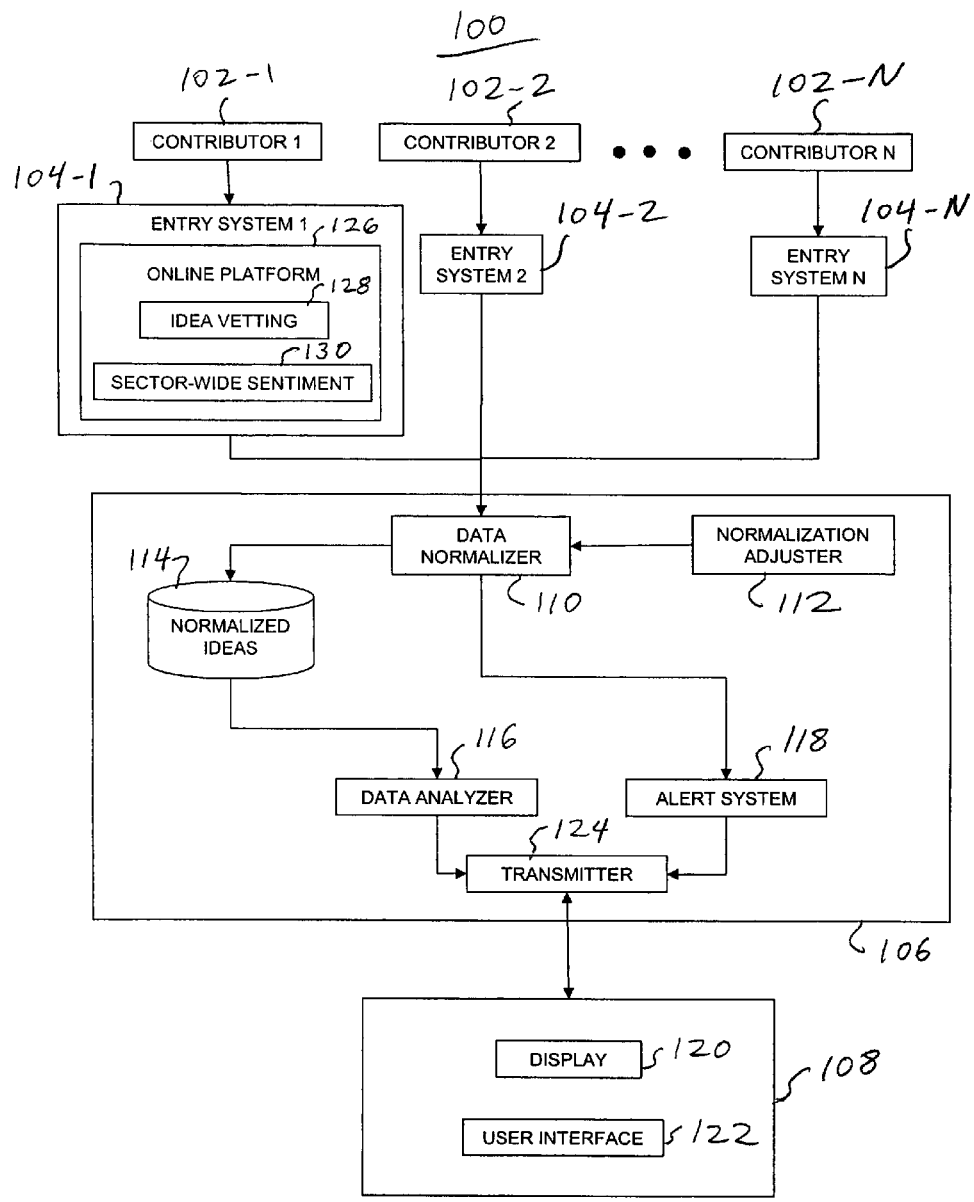
FIG. 1 is a block diagram of an exemplary apparatus for processing financial data, according to an embodiment of the present invention.

Aspects of the present invention relate to apparatus and methods for processing data. The apparatus may include a plurality of entry systems for receiving the data from a respective plurality of contributors and a tracking system. Each of the contributors may formulate the data based on respectively different input data (i.e., ideas) and rules for governing how the input data is used to formulate the data. The tracking system may include a data normalizer that is configured to normalize the formulated data received from each of the contributors into a common format. In general, the tracking system may perform at least one comparison of the normalized data (i.e., normalized ideas) from the entry system and signal results of the comparison.

According to aspects of the present invention, the data may include, but is not limited to, financial data that generally relates to transactions with financial instruments; data relating to asset classes; data relating to the performance of individual contributors; data relating to one or more markets, including market sectors; data relating to geopolitical events, data relating to macroeconomic events; modeling of data (financial or non-financial); or opinions (or sentiments) of individuals relating to data (financial or non-financial). It is contemplated that any data suitable for tracking and/or comparison across a group of individuals may be used with the apparatus of the present invention.

A tracking system, according to the present invention, may compare and track normalized data across a group of contributors and may, thus, provide aggregated comparison results for the group of contributors, which may be reviewed via each entry system. For example, an entry system may be used to review surveys, models, market sector sentiments, performance ratings of contributors and/or opinions relating to the data from the group of contributors. According to embodiments of the present invention, each entry system may allow contributors to take actions on ideas (e.g., buy or sell a stock), as well as to provide input on the data (e.g., by entering a sentiment on an event).

In general, the description herein refers to input data relating to trade/investment ideas and the processing of financial data using a portfolio tracking system. Individuals are generally referred to as contributors or users, for example, relative to a brokerage firm. Examples of processing data are generally provided in relation to developing investment strategies for financial instruments, and are not meant to be limited to financial instruments. Various financial terms are used that provide examples of processing data according to the present invention, and are not meant to be limiting. Although examples relating to stocks are described, it is understood that the financial data may also relate to futures, currencies, bonds, options, securities and sell side analysis. As described above, the data may include non-financial data. Although contributors and users are described in the examples, it is understood that the contributors and users may include any suitable group of individuals according to the type of data to be processed.

Although FIG. 1 illustrates an apparatus 100 for processing financial data, apparatus 100 represents an exemplary embodiment. An apparatus 1500, described below in FIG. 15, may also process any suitable data, as described above. For example, Apparatus 1500 may process data relating to capacities for a number of oil fields across the world. In addition, although a portfolio tracking system 106 is described with respect to FIG. 1 as a comparator to perform at least one comparison of the financial data form entry systems 104, portfolio tracking system 106 represents an exemplary embodiment. A tracking system 1506, described below in FIG. 15, may also be used to perform at least one comparison of any normalized data and to signal results of the comparison. Furthermore, although FIG. 6 describes an alert system 118 for signaling execution of instructions to a contributor relating to financial data, alert system 118 represents an exemplary embodiment. An alert system 1512, described below in FIG. 15, may also signal execution of instructions to a contributor related to any suitable data. As described further below, alert system 1512 may use current (i.e. real-time) data values, historical data values, as well as aggregate information from the group of contributors.

Although FIG. 1 describes an entry system 104 that includes an idea vetting interface 128 and a sector-wide sentiment interface 130, interfaces 128, 130 represent an exemplary embodiment. In general, interfaces 128, 130 each represent a behavior indicator interface, that may provide information to the individual contributor relating to aggregate sentiments about the data. For example, entry system 1504, described below in FIG. 15, may include a behavioral indicators interface 1526 that may be used to provide individual sentiments for the data and to review behavioral indicators based on the group of contributors.

FIG. 1 is a block diagram of an exemplary apparatus 100 for processing financial data, according to an embodiment of the present invention. Apparatus 100 includes a plurality of entry systems 104, notional portfolio tracking system 106 and at least one user device 108. Each different contributor 102-1, 102-2, . . . , 102-N provides input data based on a set of ideas relating to financial instruments to different respective entry systems 104-1, 104-2, . . . 104-N. Each entry system 104 allows respective contributor 102 to enter different parameters associated with the financial instruments and, thus, each entry system 104 receives the set of ideas in respectively different ways. It is understood that apparatus 100 may process financial data related to any suitable financial instrument, including, but not limited to, stocks, bonds, options and currencies and that the financial data may include any suitable financial models.

It is understood that each contributor 102 may enter input data through one or more entry systems 104. In addition, multiple contributors may enter input data via one entry system. For example, contributors 102-1 and 102-2 may each enter input data via entry system 104-1. Thus, each entry system 104 may receive input data form multiple contributors 102. According to another embodiment, multiple entry systems 104 may be coupled to each other in series. For example, contributor 102-1 may enter input data to entry system 104-1. Entry system 104-1 may provide the received input data to entry system 104-2, where entry system 104-2 may provide the input data (received from entry system 104-1) to portfolio tracking system 106.

Each entry system 104 receives the input data from respective contributor 102 and forms financial data including parameters relating to the selective performance of transactions with the financial instruments. For each entry system 104, the financial data is formulated based on respectively different input data and rules for governing how the input data is used to form the financial data. Accordingly, the set of ideas of each contributor are translated into input data and formulated according to the constraints and internal data processing rules of the corresponding data entry system 104. The financial data is then provided to portfolio tracking system 106 in different formats according to the respective data entry system 104.

Each contributor 102 has a different perspective on how securities are to be traded and their perspective is reflected in the formulation of the set of ideas. For example, the availability of information from each contributor 102 to formulate the set of ideas may be different depending upon the entry system 104. In addition, the internal data processing rules may also vary by the individual contributor 102.

Portfolio tracking system 106, thus, receives the set of ideas from each contributor 102 in the form of financial data formulated according to the corresponding entry system 104 and functions as a comparator to perform at least one comparison of the financial data from entry systems 104 and to signal results of the comparison. In an exemplary embodiment, portfolio tracking system 106 normalizes the differently formatted financial data from each different contributor 102 into a common format. Portfolio tracking system 106, thus, determines normalized ideas for each contributor 102 that are not influenced by the associated entry system 104 and, instead, reflect the set of ideas of each contributor 102.

Portfolio tracking system 106 includes data normalizer 110, normalization adjuster 112, data analyzer 116, memory 114, alert system 118 and transmitter 124. Normalized ideas may be determined by data normalizer 110, analyzed by data analyzer 116 and provided to user device 108 via transmitter 124. Accordingly, data analyzer 116 compares the financial data from different contributors, after being normalized, and the results of the comparison may be provided to at least one of the contributors via user device 108. The comparison by data analyzer 116 may include comparison with further data corresponding to historical data values that are collected over predetermined time periods. Users of portfolio tracking system 106 may review financial data of individual contributors, as well as groups of contributors, based on the normalized ideas. Data analyzer 116 may also separate and weight the normalized financial data to provide further results of the comparison of the financial data to at least one of the contributors.

In addition, the normalized ideas from data normalizer 110 may also be analyzed by alert system 118. Various alerts may be signaled to at least one of contributors 102 by alert system 118, via transmitter 124, when execution of instructions corresponding to at least a portion of the financial data achieves a predetermined result. Accordingly, transmitter 124 is signaled by at least one of contributors 102 to recognize a result.

Although one user device 108 is shown, it is understood that any suitable number of user devices 108 may be included, depending upon the number of users, described below, of portfolio tracking system 106. In general, user device 108 may include display 120 for reviewing the performance data and alerts and user interface 122 for interacting with portfolio tracking system 106, such as for adjusting parameters to review performance data. Suitable components of user device 108 may be understood from the description herein. It is understood that any suitable connection between portfolio tracking system 106 and user device 108 may be used. Although user device 108 is illustrated as being separate from entry systems 104, it is contemplated that one or more entry systems 104 may be included as part of user device 108.

Users of portfolio tracking system 106 may include contributors 102, as well as contributor managers, other individuals at a contributor's firm and/or users. Contributors 102 include individuals who enter sets of ideas into portfolio tracking system 106 and may monitor the effectiveness of their ideas, singly and as a portfolio. Contributors 102 may compare their current and historical performance with the performance of other contributors 102 via portfolio tracking system 106. Not only can contributor managers use the portfolio tracking system 106 to monitor contributors of their team, but contributor managers may receive quarterly broker reviews as well as weekly electronic summary documents related to their contributors. Contributor managers will likely not contribute ideas but are responsible for a group of idea contributors. Portfolio tracking system 106 may provide contributor managers with a method for tracking the productivity of their contributors, singly and in aggregate. Other individuals of a contributor's firm may include as marketing, sales, and/or management personnel. The other individuals may mine the historical data from contributors 102 to extract facts that can be used to promote their services to new clients and to select a subset of contributors for a specific client with a specific style. Users may use portfolio tracking system 106 to understand which contributors and firms are more effective at the user's different stylistic needs. The performance data from portfolio tracking system 106 may be used to determine how much emphasis (e.g., compensation to contributors, or capital to be placed behind a particular set of ideas) may be placed on any particular contributor's ideas, as well as which contributors should be relied upon to strengthen a particular investment style.

Portfolio tracking system 106 allows contributors 102 to enter their trade ideas, or any type of investment idea, into respective entry system 104. Entry systems 104 may be proprietary systems or third party systems, and may capture data in different formats. Contributor 102 provides the set of ideas to respective entry system 104 according to the available entry system format. Portfolio tracking system 106 may support and expect, for example, thousands of individuals 102 to enter their own ideas using the available entry system 104.

The set of ideas that contributors 102 enter in respective entry systems 104 has some commonality, but often can be structured slightly differently, depending upon entry system 104. The idea data may be presented in many formats, and typically include some or all of the information about a specific idea for how a financial instrument is to be traded. Typical idea parameters include a financial instrument name, a suggested action, a target price, a target time frame, a suggested amount of the transaction, a stop loss and a conviction level behind the idea.

For example, a set of ideas generally includes parameters indicating what a trade is for. An exemplary idea would be an idea for buying or selling shares of a particular company (e.g., IBM). The trade idea may include a goal for buying or selling shares of IBM, where the goal may be written as a desired target price. Accordingly, a set of ideas may include buying IBM where the desired target price may be $120 per share. The set of ideas may include a timeframe parameter in which IBM may be projected to move up to $120 per share from a current price of $100 per share, such as 3 months. In addition, the set of ideas may include the ability to support entry of constrained idea justification.

An investor may know, however, that his trade ideas are not always correct. The set of ideas may, thus, include a stop loss parameter. For example, if the trade idea does not produce good results and, instead of increasing from $100 per share to $120 per share, IBM starts dropping to $95 per share and then $92 per share, stop loss may provide a way to exit or close the trade. For example, the trading idea may set a stop loss at $90 per share.

Finally, individual contributors 102 may have different levels of conviction in a set of ideas. For example, contributor 102-1 may follow IBM regularly and know that the trade idea is a good idea, and in fact it is contributor 102-1's best idea. Contributor 102-1 may, thus, set the trade idea with a very high conviction. Another contributor 102-2, may set the trade idea with a medium conviction. For example, contributor 102-2 may believe that there are certain scenarios where a trade idea may reach fruition and if those scenarios take place then the stock price may increase to $120 per share. Contributor 102-2, however, may not be positive that certain events are possible. Examples of events may include the effect of sudden changes in inflation or in energy prices.

Entry systems 104 may include any suitable online platform that allows contributors 102 to define parameters for trade ideas, including freeform email. Contributors 102 may submit ideas to entry systems 104, for example, via email, telephone, any suitable mobile device and/or instant messaging. For example, an email may include a trade idea relating to IBM, with a 3 month timeframe parameter (for example). For example, contributor 102-1 may use an internal system, such as a specific system at brokerage firm A, to enter the trade ideas under the constraints of entry system 104-1, whereas contributor 102-2 may use a third party tool, or they may use any other entry system 104-2.

According to one embodiment of the present invention, one or more entry systems 102 of the present invention may include an online platform 126 that allows contributors 102 to define parameters for the trade ideas, described further below with respect to FIGS. 9A-14C. Because different entry systems 104 may provide different amounts of data to portfolio tracking system 106 in different formats, online platform 126 may be configured to support the different formats associated with each entry system 104. In general, online platform 126 may provide screen layouts for idea entry, confirmation of data entry (including idea entry, idea amendment and closing of an idea), idea review, and idea closing.

As described above, contributors 102 may have a broad set of information available for ideas and may be able to enter all or only some of this information into respective entry system 104. In addition to the parameters that may govern the information entered into entry system 104, each entry system 104 may capture information provided from respective contributor 102 in different ways. Accordingly, different entry systems 104 may provide different amounts of data to portfolio tracking system 106 in different formats as the respective financial data.

For example, one entry system 104-1 may not support a stop loss, whereas another entry system 104-2 may allow contributor 102-2 to set a price for a stop loss of, for example, $90 per share. Another entry system 104-N may require that there is always an automatic stop loss and that it is a percentage movement. For example, if there is a 5% decrease, there will automatically be a stop loss on the trade idea by entry system 104-N.

Portfolio tracking system 106 receives financial data from each entry system 104 according to the entry system format. Because each entry system 104 may be different, there is no standard data format for the financial data. In order for portfolio tracking system 106 to determine a value from analyzing an aggregated data set from all contributors 102, the trade ideas from all of these different entry systems 104 may be normalized by data normalizer 110.

Meta-data is typically generated by each entry system 104 when the input data from the respective contributor 102 is formulated into financial data. Data normalizer 110 receives the meta-data from each entry system 104, scans the entered data and identifies different idea parameters. Based on the specific entry system 104, data normalizer 110 may distinguish the idea parameters provided in the financial data by the specific entry system 104 from the idea parameters provided by contributor 102. For example, if an entry system 104 automatically puts in a stop loss at a decrease of 5% and it is not part of the contributor-defined idea, data normalizer 110 may treat that information differently from a case where contributor 102 specifically entered an 8% stop loss or a $10 stop loss.

Data normalizer 110 takes a profile of the meta-data that accompanies the trade idea of contributor 102 that has been submitted through an entry system 104. For example, in one entry system 104-1 contributor 102-1 may not be able to independently define how large the investment should be, such as $1 million or $2 million, versus their conviction level. Instead, entry system 104-1 has preemptively chosen to tie those parameters together, linking conviction level to a specific investment size regardless of the market value of the underlying security (e.g., linking a very high conviction level with a $3 million investment, a high conviction level with a $2 million investment and a medium conviction level with a $1 million investment).

The above example illustrates some of the problems of the industry standard. For example, if contributor 102-1 is interested in investing in a highly traded company, such as the Apple Computer Company, $1 million dollars is typically smaller than may be reasonably invested. If the idea is for a small cap stock, however, $1 million may represent more than the average daily value, and thus be too large to reasonably consider transacting.

Data normalizer 110 analyzes each set of ideas by examining the entry system 104 from where the financial data was delivered, and normalizes the corresponding financial data to provide normalized ideas. By normalizing the financial data, portfolio tracking system 106 normalizes size information of the contributor position (i.e., for a position-idea). Thus, the tools of portfolio tracking system 106 may be used to examine the risk tolerance and the conviction level of the user to estimate what the size of the position-idea should be.

As another example, contributor 102-1 may submit a trade idea from entry system 104-1 that includes a field for size. Accordingly, data normalizer 110 may acknowledge that contributor 102-1 proactively provides the desired size. In that case, data normalizer 110 may analyze the size of the position-idea based on realistic market constraints. Data normalizer 110 may still examine the position-idea whether, for example, contributor 102-1 is proposing a $10 million position in a stock that only trades $2 million a day. Data normalizer 110 may then reduce the position-idea because it is not a realistic position. However, if the idea was realistic, then the normalized idea may be provided to memory 114, to store the normalized idea data.

For inputting freeform text messages, data normalizer 110 performs a process called shredding. Data normalizer may take the received text, if in fact it is a freeform text message, and perform a best guess as to which fields are described using a glossary or lexicon of terms that may be suitably matched. A confidence ratio may be used to determine, for example, that a text message describes "buy" and a price at a high confidence. As another example, the message may describe a time frame or target time frame and a date with a high confidence. When a low confidence is determined, an exception may be generated which causes the information to be ignored or provided to a human in order to validate what information is being requested.

In general, data normalizer 110 receives the financial data from each entry system 104 and normalizes the financial data as a record. Normalization adjuster 112 adjusts the record using market data, for example, such as the average daily volume associated with a stock, to determine if the size of the position-idea that is proposed is reasonable. Market statistics may then be used to estimate what the cost would be to buy or sell this position. The cost may include what the commissions would be, as well as slippage, i.e., the impact on cost or price in the markets if one were to actually execute the recommended idea.

As known to the skilled person, one cannot necessarily buy as much stock as desired at the quoted price. The stock that one is trying to buy may increase the demand in the market and there may be a mismatch in the buyers and sellers. The price may, thus, start drifting up. If one buys a very small percentage of a liquid stock, there are chances that the stock price would not likely move. If one desires to take a very significant percentage, in contrast, then the stock price would likely move. Normalization adjuster 112 uses models on what the slippage would be, i.e., how much the stock would move. Models of slippage are known to the skilled person and it is understood that any suitable model of slippage may be used.

Data normalizer provides a series of adjusted records, i.e., normalized ideas, that are stored over time in memory 114. The normalized ideas are the set of ideas for financial instruments that are fully analyzed with a combination of information given by respective contributor 102, the application of any sanity checks, the addition of historical or market data and an understanding of the limitations of the specific entry system 104. Each of the normalized ideas may be attributed to a different contributor 102 and, in turn, that contributor 102 may be attributed to a different investment firm having their own internal investment processing rules. Although memory 114 is illustrated as being an internal memory of portfolio tracking system 106, it is understood that memory 114 may 218 may be an external memory on a remote device.

Figure 2:
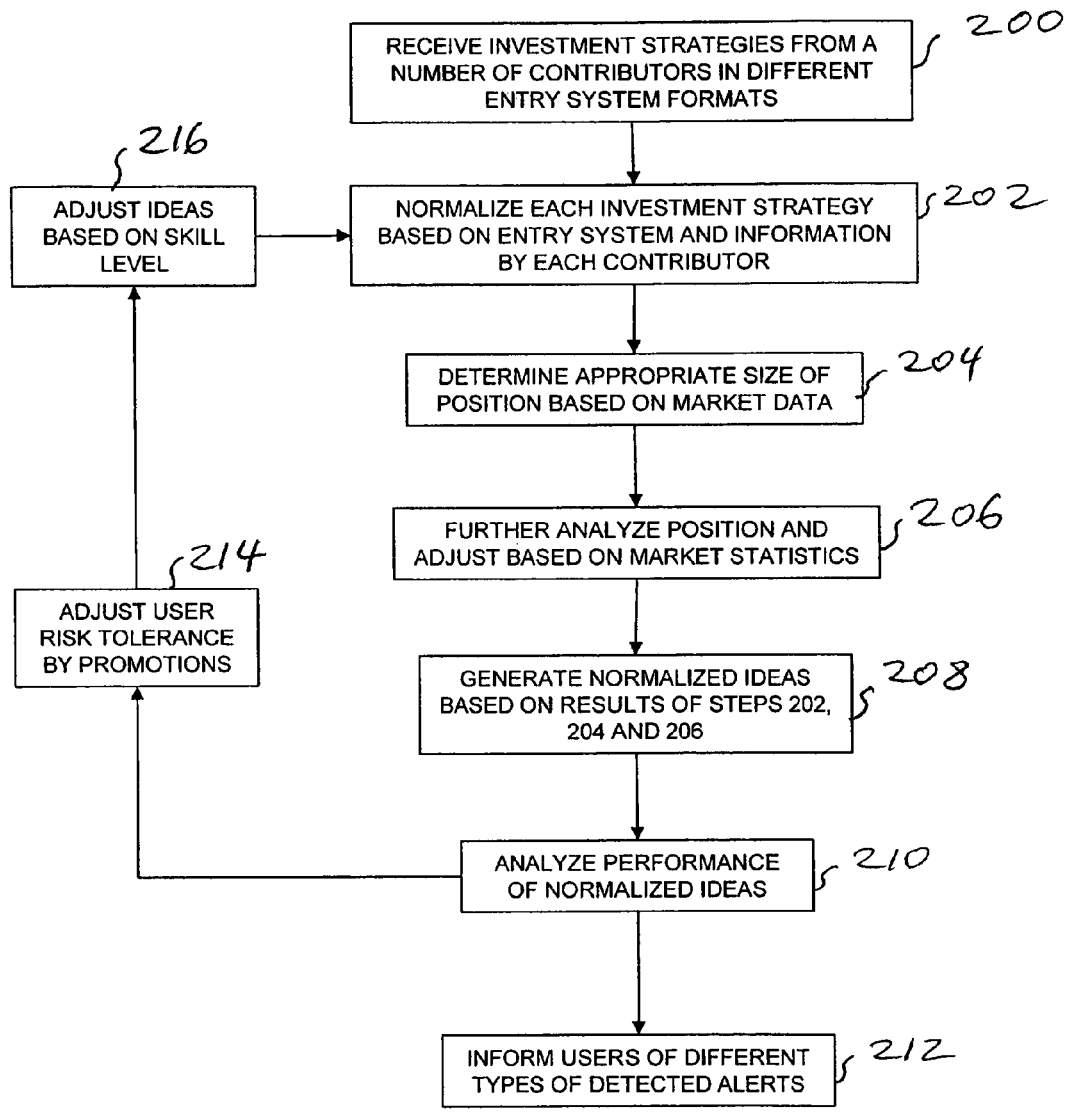
FIG. 2 is a flowchart illustrating an exemplary method of analyzing differently formatted financial data from a number of different contributors, according to an embodiment of the present invention.

FIG. 2 is a flowchart illustrating an exemplary method of analyzing differently formatted financial data from a number of different contributors, according to an embodiment of the present invention. In step 200, investment strategies are received from a number of contributors in different entry system formats, for example, from contributors 102-1-102-N via respective entry systems 104-1-104-N (FIG. 1). In step 202, each investment strategy for each contributor is normalized based on the entry system format and information provided by the respective contributor, for example, by data normalizer 110 (FIG. 1).

In step 204, an appropriate size of the position-idea is determined for each contributor based on market data, for example, by normalization adjuster 112 (FIG. 1). In step 206, each contributor's position-idea is further analyzed and adjusted using market data.

In step 208, normalized ideas are generated based on the results from steps 202, 204 and 206, for example, by data normalizer 110 (FIG. 1). In step 210, the individual performance and group performance of contributors are analyzed using the normalized ideas determined in step 208, for example, by data analyzer 116 (FIG. 1). In step 212, alerts are generated and provided to users of portfolio tracking system 106, for signaling when the execution of instructions related to the financial data of at least one contributor achieves a result for example, by alert system 118 (FIG. 1).

In step 214, a user-specific risk tolerance may be adjusted by promotions based on an aggregated point score, described further below, for example, that may be determined by data analyzer 116 (FIG. 1). In step 216, ideas are adjusted based on a skill level and are used to update the normalization performed in step 202. Not all contributors 102 are equally effective nor equally well understood in terms of their effectiveness at proposing trade ideas. Thus a feedback loop (via steps 214, 216) may be created to automatically update the confidence level in each contributor's ideas based upon the quantity and effectiveness of those ideas. This feedback can be taken in aggregate per contributor or segmented by different styles or names in which the contributor may enter ideas. Whatever the granularity of the feedback loop, the information can be used to rank the effectiveness of the contributor, both relative to other contributors and on an absolute scale. The result of this ranking may then be used to lessen or tighten the risk-constraints placed on the contributor's ideas. In practice, this means that during the idea normalization phase ideas will be sized based on the skill level of the contributor. A higher skill may allow for higher risk tolerance per idea and may result in larger idea positions. In contrast, a lower skill may allow for a lower risk tolerance per idea and result in smaller idea positions.

Figure 3:
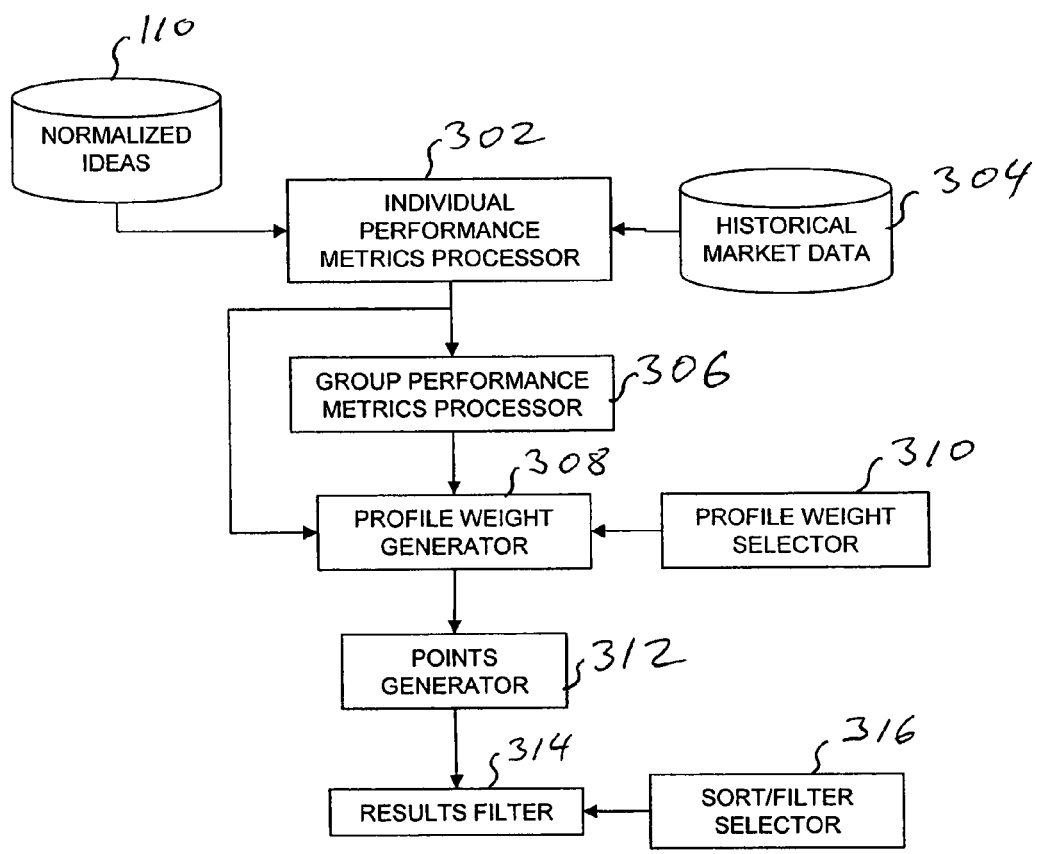
FIG. 3 is a block diagram of a data analyzer of the exemplary notional portfolio tracking system shown in FIG. 1, according to an embodiment of the present invention.

FIG. 3 is a block diagram of data analyzer 116 of exemplary portfolio tracking system 106 according to an embodiment of the present invention. Data analyzer 116 includes individual performance metrics processor 302, group performance metrics processor 306, profile weight generator 308, profile weight selector 310, points generator 312, results filter 314 and sort/filter selector 316. Users of portfolio tracking system 106 may review an individual contributor's performance and a group of contributors' performance from the analysis by respective individual performance metrics processor 302 and group performance metrics processor 306. Users may also apply profile weights by profile weight generator 308 to filter sets of ideas from contributors 102 based on the interests of the user. In addition, users may rank the filtered sets of ideas by points generator 312, to generate a list of best to worst contributors according to the customized interest of the user. Finally, users may sort the results of the ranking using results filter 314.

Individual performance metrics processor 302 receives individual normalized ideas from contributor 102-1, for example, John Doe, and examines how well the normalized ideas perform with respect to the marketplace. Individual performance metrics processor 302 determines a theoretical return that John Doe would have had in the market if John had actually bought or sold stock, or any other financial instrument, according to the normalized ideas. The normalized ideas are aggregated by an individual contributor 102-1, for example, and filtered for a user selectable time period. The normalized idea data is coupled with historical market data from memory 304 to determine multiple industry standard metrics. The standard metrics may include a net return (relative and absolute), a gross return (relative and absolute), an alpha return (relative and absolute), Sharpe ratios for aggregated portfolios, a frequency of trade ideas and an accuracy of trade ideas. The Alpha return may include a net Alpha return. Although several industry standard metrics are described herein, it is understood that the performance metrics may include any suitable measure of contributor performance, based on the type of normalized idea data that is provided via entry systems 104.

For example, because an analysis of contributor 102-1 is being performed, individual performance metrics processor 302 aggregates all of the ideas that contributor 102-1 has entered, for example, over the past three months or any arbitrary time period since contributor 102-1 started submitting ideas. Individual performance metrics processor 302 may determine that contributor 102-1 has had an absolute return of 10% on the ideas in his notional portfolio. Accordingly, if portfolio tracking system 106 had actually bought or sold stock in the marketplace at the time contributor 102-1 suggested with an idea to buy and sell it, and then moved forward to today, the market price of the selected stock, as well as the contributor's other ideas, may have fluctuated.

It is desirable to realistically model the amount that contributor 102-1 is allowed to buy of a certain stock and the estimation of what that contributor's market impact may be. For example, if someone were allowed to buy 100 times the available stock of a very thinly capitalized stock and if that stock moved by an eighth of a point, that movement might equate to a doubling of the value of the stock (if, for example that stock was a penny stock). In theory, this contributor has doubled his money on a large basis. In practice, however, that is unrealistic. Data normalizer 110, as discussed above, has pruned out the unrealistic aspect of trade ideas. Accordingly, when individual performance metrics processor 302 examines the individual performance metric for an individual idea, it is a good reflection of the absolute return of that trade idea and the aggregation of those ideas if the contributor's investments were actually conducted in the marketplace and sized realistically.

When contributors 102 use portfolio tracking system 106, contributors 102 are not only interested in their ideas. Contributors 102 may also want to know how well they did the previous quarter. For example, over last quarter contributor 102-1 may have been paid quarterly or some event may have occurred in the marketplace, such as after the Federal Reserve raised interest rates. Contributor 102-1 may want to look back over a time period and see how his ideas performed. Individual contributors 102 may review a summary of their data for any time period according to the industry standard metrics, based on the analysis of individual performance metrics processor 302.

As an example of gross return, for example, contributor 102-1 may put in a trade idea to purchases shares of IBM at $100 per share and with the target of selling it at $120 per share. The gross return would be $20 per share, taking into account none of the slippage and none of the commissions that really would have occurred/been incurred.

The net return is a closely related item to the gross return, which is typically closely followed by users of portfolio tracking system 106. The net return takes the gross return and subtracts from it the commission costs and market impact that is estimated through the slippage. From the above example, the net return is the $20 gross return subtracted by the applicable commissions, and subtracted by the fact that the individual may have moved the market by selling. Accordingly, if the stock was listed at $120 per share and the individual sold, he may only have gotten $119 and ⅞ per share because he was impacting the market by selling. The net return is a metric that may be compared to the major indices. (Even if an individual notices, however, that they have a net return of 10% compared to the major indices, it may be difficult to determine whether this is a good or bad net return. Without understanding with what to compare the net return, it may be difficult to determine whether the net return is acceptable.

The net Alpha return is often defined as the return that one obtains in excess of the return of the market itself. For example, if the market went up 8% over a period of a quarter, and contributor 102-1's portfolio went up 10% during said quarter, the Alpha return would be 2%. In other words, if the individual's trade ideas had been invested instead of just in the broad market, an extra 2% would be gained compared to the market indices such as the S&P 500. Both the net return and the net Alpha return typically take transaction costs and any slippage into account in their calculations.

For each of the gross return, net return and net Alpha return, there is both an absolute and a relative figure of merit available. The absolute return would be, for example, if an individual made $20 per share and had 100,000 shares for a $2 million absolute profit. A relative return may also be determined. The relative return would be, for example, if the stock went from $100 to $120, such that the individual made a 20% gain. These examples do not include commissions or slippage, which would typically be accounted for in the net return or the Alpha return numbers and may slightly change those returns numbers. It is understood that a high percentage gain may not equate to a high absolute return due to the size of the original idea.

The Sharpe ratio is another very important factor for review by investment houses and portfolio managers. It is a reflection of how reliably or consistently the results that have been returned can be projected forward. Accordingly, the Sharpe ratio provides a measure about the consistency of an individual's performance. Thus, if an individual has a high Sharpe ratio, it is likely that over the coming months the individual will continue to produce similar positive results. In contrast, a person having a low Sharpe ratio will not likely continue to have similar positive results. The Sharpe ratio is also typically a useful measure for distinguishing between individuals with high performance. If an individual has a performance of 20% but with a very low Sharpe ratio, that may be indicative that this individual was gambling with his trade idea. In other words, the individual may first make 10%, then lose 30% and then make 100% on his ideas. At the end of some period of time, this individual may be up 20%, but his performance has been so erratic that there is very little predictive ability to say how well he may do going forward. Accordingly, people who want to evaluate the effectiveness of certain contributors may examine the Sharpe ratio in conjunction with the returns of the system.

The metrics of frequency and accuracy of ideas are generally less of an industry standard but may be used to gauge the productivity of the individual contributor. Contributor 102-1 may have a net return or an Alpha return of 20%, but may have had only one trade idea. If contributor 102-1 had only one idea, it may be difficult to predict how his performance will be in the future. On the other hand, contributor 102-2 who has good performance with many ideas is probably more consistent, and portfolio tracking system 106 may be better able to evaluate the consistency of contributors, in general, who have more than one idea. Accuracy of ideas is also related to the Sharpe ratio in that it shows the percent of individual trade ideas that beat the market. The accuracy of ideas provides a measure of how many of the individual ideas beat the market as opposed to the whole portfolio.

As described above, there are various industry standard metrics that an individual contributor can look at to characterize their performance. A problem occurs, however, because there are many metrics and large amounts of data for each contributor. All of this data for the individual set of ideas may be reviewed and analyzed. If a company, however, is running an organization of several hundred institutional sales people and wants to know how well the organization is doing, i.e., how good are a given organization's sales people at predicting markets or creating good stock ideas, it may be difficult to determine who is best from the individual performance metrics. In fact, there is also no single objective measure of "good" performance.

Portfolio tracking system 106 includes a group performance metrics processor 306 that determines a consistency in performance for each contributor. In one embodiment, portfolio Sharpe ratios may be sorted from best to worst and assigned 100% to the best performer and 0% to the worst performer. In an alternative embodiment, all Sharpe ratios may be pruned below 10% and above 90%, thus removing the effects of outliers on the data set. The Sharpe ratios may then be linearized. Accordingly, group performance metrics processor 306 provides a bridge between looking at individual contributor performance (calculated by individual performance metrics processor 302) and the performance of groups of contributors.

It may be desirable to normalize consistency, because the set of ideas of individual contributors are subjective or discretionary, and the effectiveness of trade ideas varies with certain market conditions. Thus, for example, if a given market drops substantially, one may find that most every contributor has had lower returns. However, more erratic Sharpe ratios are lower Sharpe ratios. Accordingly, it is invariably desirable to contributors, to their management and for the users who receive this information to understand not just the return and Sharpe ratio, but how this individual or group of individuals compared to a larger pool.

Consistency may take a range (e.g., perhaps the worst performer has a −1 Sharpe ratio and the best performer has a 1.2 Sharpe ratio). The consistency of a group of contributors may be tracked over a time period. For example, a month later or a year later a user may look at a group of people in the market who have been doing well. At this point in time, the worst performer may have a Sharpe ratio of 0.5 and the best one may have a Sharpe ratio of 3. Because the mean or the average of the group is moving, the user may want a way to quickly recognize how good an individual's consistency is with respect to the larger world around them. Accordingly, group performance metrics processor 306 calculates this consistency.

Group performance metrics processor 306 is able to relate the Sharpe ratio of an individual to that of a larger group to understand how they perform with respect to their peers. A contributor 102-1 may have had a Sharpe ratio of 2 last year. However, that Sharpe ratio has some of the same problems of net return. Compared to the market, it may be desirable to know whether the contributor had a good or a poor return. It may also be desirable to know, compared to the larger group of contributors, whether the return is a good or a poor return. Calculating the consistency is a way of creating a normalized canonical order of best to worst contributors. While always valuable, this may become especially desirable when there is a system that can actually take in data from many contributors on many entry systems across many companies.

As an example, contributors at financial institution A typically only know how their peers have performed. But they don't know how've they've done compared to the larger group of people at, for example, financial institutions B and C, as well as consumers, such as retail investors. By trading on exemplary portfolio tracking system 106 that takes in ideas from different companies, different entry systems 104 and different contributors 102, portfolio tracking system 106 aggregates a much broader set of information than is normally available. In order to trade with such a broad set of information, group performance metrics processor 306 calculate consistency across all individuals across a group of contributors 102.

Portfolio tracking system 106 also includes a profile weight generator 308 that receives group performance metrics and/or individual performance metrics and applies profile weights to the respective metrics. Profile weight generator 308 may filter sets of ideas based on the interests of a client. Filters may include, for example, including or excluding shorts, including or excluding small cap ideas, such that part of the weights may be used to be an absolute filter. Profile weight selector 310 may be used to select predefined user profile weights or manually selected weights for profile weight generator 308. The weights may be used for a set of parameters, such as to show the results of all contributors who have only ideas from contributors that fit selected metrics. The purpose of such a system is to enable the quick repurposing of the data in the engine to evaluate different results based on varying the profile (weights).

Many people use investment ideas for different purposes. For example, a sales person at financial institution A may have different types of clients that may have different investment styles. Retail mutual funds, in most cases are prohibited from shorting stock. Hedge funds typically are willing to have both short and long investments.

Going long means buying a position and holding on to it. Going short means that although an individual doesn't own stock, the individual will borrow shares of that stock and then sell it with the idea that in the future the individual will buy it back. For example, an individual's expectation is that he may borrow and then sell IBM at $100 per share with the intent that a week from now, when he has to produce the IBM stock, he will buy it at $97 and return it to the person from whom he borrowed it. In going short, the individual uses an arbitrage across time saying that he thinks the market is going to move against IBM.

Other clients may have styles that relate to technology funds, whereas further clients may be internationally focused. There are still additional clients that are small or mid-capped focused, for example, they may want to invest in companies that have market capitalizations of between $100 million and $500 million.

For example, the manager at financial institution A may have 300 sales people who have contributed ideas. A new client, who is a technology oriented long-only mutual fund or a long-only, growth-oriented mutual fund, is interested in working with financial institution A. A manager may say he has a total of 300 contributors with an average return of 12%. However, that information may not be an appropriate metric to give to the potential user because many of those ideas may be contradictory to the charter of the client (such as trading ideas on selling short in healthcare). Simply telling a client that a manager can achieve a 12% return does not provide appropriate information to the potential client. The manager can review the data and attempt to manually cull out trade ideas that were only long and/or from a given sector to create a more appropriate summary.

However, another potential user that is a hedge fund and market neutral is interested in working with financial institution A and wants to see portfolios of contributors that were net neutral, i.e., the portfolios had as many short positions as long positions. A further new user that focuses on emerging markets may request to review only emerging market ideas. This manual summary procedure may very quickly become an untenable burden. Although an example with a manager is illustrated, it is understood that there are many other people who may want to review and use this information.

For example, contributors 102 may be interested in reviewing their Alpha return, net return and consistency in different ways. A market neutral firm might put a very high weight on Alpha return and a very low weight on net return. A firm that is allowed to go short, but is largely a buy and hold long term investor, may put a much higher weight on the net return.

Because portfolio tracking system 106 includes profile weight generator 308, an interface is provided such that a user of portfolio tracking system 106 can set, for example, absolute filters, excluding specific categories of ideas and then evaluating the remaining data to determine who are the best contributors in order to serve specific firm XYZ. For the specific user, their specific weighting is applied, for example, such that there could be a 90% weight on the net return and a 10% weight on the net alpha return and a discounted consistency by applying a low multiplier for consistency.

With portfolio tracking system 106, the normalization that is applied (via data normalizer 110) to the trade ideas that are collected (from contributors 102 via entry systems 104), allow for a single system to store and maintain all of the normalized ideas. By simply selecting a pre-defined profile (i.e., a set of pre-defined weights equates to a profile) or by directly changing the weights (with profile weight generator 308), for example, for specific applications for a firm that is a long mutual fund company, a user of portfolio tracking system 106 may provide a list of best contributors, in an ordered rank, as well as provide a comparison of the results with another firm. For a market neutral hedge fund, applying appropriate weights likely will highlight a totally different group of individuals with a different return. Thus, the manager now is able to calculate an investment return using portfolio tracking system 106 and is able to direct his contributors to the accounts for which they will provide and presumably extract the most useful information. Any brokerage firm may use these techniques to evaluate their contributors in each environment regardless of whether the system is also deployed by a client firm that has access to contributors at multiple brokerages.

A manager of idea contributors, however, may not want to have a contributor working on too many different clients with possibly diverging investment styles. Thus, not only is the firm that uses portfolio tracking system 106 getting a benefit because they are able to put their performance in the best light by showing only those contributors who would be applicable to the client, but the contributors are able to then allocate resources to the clients with whom their ideas will have the maximum impact.

Portfolio tracking system 106 also includes points generator 312 that receives the filtered metrics and determines an aggregate point score for all contributors by combining all of the metrics after the weighting has been applied. By combining all metrics together into one point score, portfolio tracking system 106 may value virtually any investment style, including, for example, long-only, market neutral, small cap, international, etc. Points generator 312 provides a flexible method for combining disparate data sets into monolithic ranking results in which the weights may be used to custom tailor the ranking results to the needs of the user. An example of an aggregate point score is shown in equation (1) as:

$$\text{Points} = A*\text{Return} + B*\text{Alpha Return} + C*\text{Consistency} \qquad (1)$$

where A, B and C represents weights which are selectable for individual contributors or as a group of contributors. For example, preset weights may enable recalculation of points for the customized needs of the user. Examples of preset weights include: $A=0$, $B=1$ and $C=0$ for a long only fund and $A=0.75$, $B=0.25$ and $C=1$ for a market neutral hedge fund. The aggregate point score collates all of the net return, alpha return and consistency information (such as the Sharpe ratio) into an ordinal list containing all contributors (from the best contributor to the worst contributor) and the average contributor. Although two examples of preset weights are presented above, it is understood that any suitable combination of weights may be used to generate a customizable aggregate point score.

The aggregate point score provides the ability to take all the trade ideas and applicable metrics, and modify them into a points result based on the user or based on a desired evaluation. The ordinal list is, thus, customized and provides the best and worst performers for each particular application. Portfolio tracking system 106 stores the normalized ideas in memory 110 and, in addition, individual and group metrics are already determined. Accordingly, profile weight generator 308 and points generator 312 filters the trade ideas and metrics to generate customized aggregate point scores suitable for an individual user.

It is understood that equation (1) is representative of one method to generate an aggregate point score. The aggregate point score may also take into account, for example, factors related to frequency of ideas and accuracy of ideas. For example, some firms are limited in how much they can invest in any one idea. Even if a contributor has two or three great trade ideas the user may be limited as to how much money they can make off those ideas, because they can only invest $100,000 in any one idea. In this case, frequency of ideas is a strong component of the value received by the client. Although eq. (1) represents a points score, it is contemplated that other metrics, such as behavioral performance metrics, may be used, instead of or in conjunction with the points score, to provide a user with feedback relating to the normalized ideas for all of the contributors.

If there are only two or three trade ideas of a firm that can only invest $100,000, the firm may not generate a substantial amount of money, even if the stocks underlying the ideas went up 500%. In other words, a firm that could have put $10 million behind each trade idea would realize a significantly larger net increase. Accordingly, an aggregate point score may be developed for the contributor that is valuable to the firm that can put relatively large amounts of money behind the trade ideas.

Another example includes a contributor who has a good net return and many trade ideas, but very poor accuracy. For example, assume contributor 102-1 had 100 trade ideas, 49 of which lost money. A good return might occur because one of those 100 ideas had a ten fold return and the others moved much less. For example, client A is limited as to how much they can put in any one position, say $100,000. Because the accuracy is low and because the client was not going to put that much money behind any one idea (such as the 51st remaining idea that did particularly well), the client actually didn't do that well because they limited themselves to the $100,000 per idea.

In the above example, the aggregate point score may include not just the Alpha return, net return and consistency measures, but also the frequency of the ideas times the accuracy of the ideas. If there is a very high frequency, say 100 ideas per month and the accuracy is 51%, that might be of low value to some clients and high value to other clients. If the accuracy was 90%, but the frequency of ideas was 10 per month, this would be valuable to a different group of clients who favor accuracy over quantity.

Portfolio tracking system 106 also includes a results filter 314, configurable by sort/filter selector 316, to display the results on user device 108. Contributors 102, the contributor's manager, the user and/or any of a wide group of people may selectively view results on user device 108 in multiple ways. Individuals may choose to filter the results of all contributors for certain behaviors, using sort/filter selector 316, such as to include only United States (U.S.)-based investment ideas and then sort by points. For example, referring to FIG. 5A, a table of example results is shown that illustrate price, position, return and points for a number of contributors.

In systems with many data records (row entries), there may be so many items that match a search that it may be difficult to analyze the results. For example, if there is a table of contributors that shows the performance of each contributor, an individual contributor may want to review his performance. With many row entries, it may be difficult to locate the individual contributor.

Figure 5B:
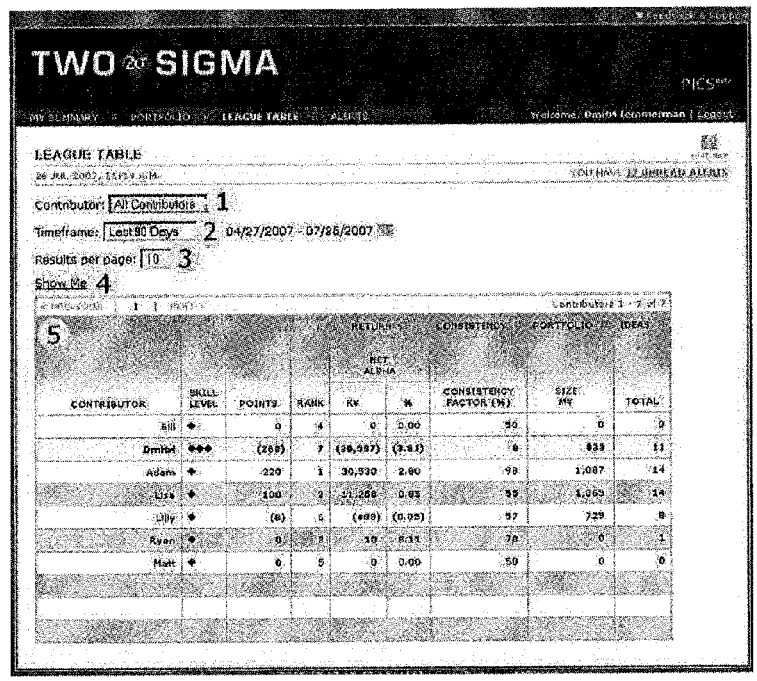

Results filter 314 includes a "Show Me" function, which may be valuable when an individual is looking for a unique row. Referring to FIG. 5B, a table of example results are shown that illustrate points, rank, return, consistency and ideas for a particular contributor, Dimitri, with the "Show Me" function. If Dimitri is one of 1,000 contributors and wishes to be compared only to those people doing U.S.-based investments, Dimitri can filter the display accordingly and click "Show Me." Even if the table is 10 pages long with 100 contributors per page, the results filter 314 causes the table to jump to the page with Dimitri's row. Dimitri can also use sort/filter selector 316 to only include U.S. ideas and sort by the highest points and then quickly find himself among the many pages of records.

The sort/filter selector 316 may be used to sort different rows, for example, net return, alpha return, number of positions, absolute return, percent return, consistency, Sharpe ratio, etc. In financial services, individuals typically want to identify contributors that have moved up or down by the largest amounts (long or short). Additionally, another selector may be used to sort performance data from high to low, or from low to high. Wherever there are numeric values, sorting may be provided by absolute value from high to low. This type of sorting may be useful to determine which of an individual's stocks have increased or decreased the most. By searching according to absolute value, it may be easier to determine changes of direction in the individual stocks or to focus on the largest positions in a portfolio.

Figure 4:
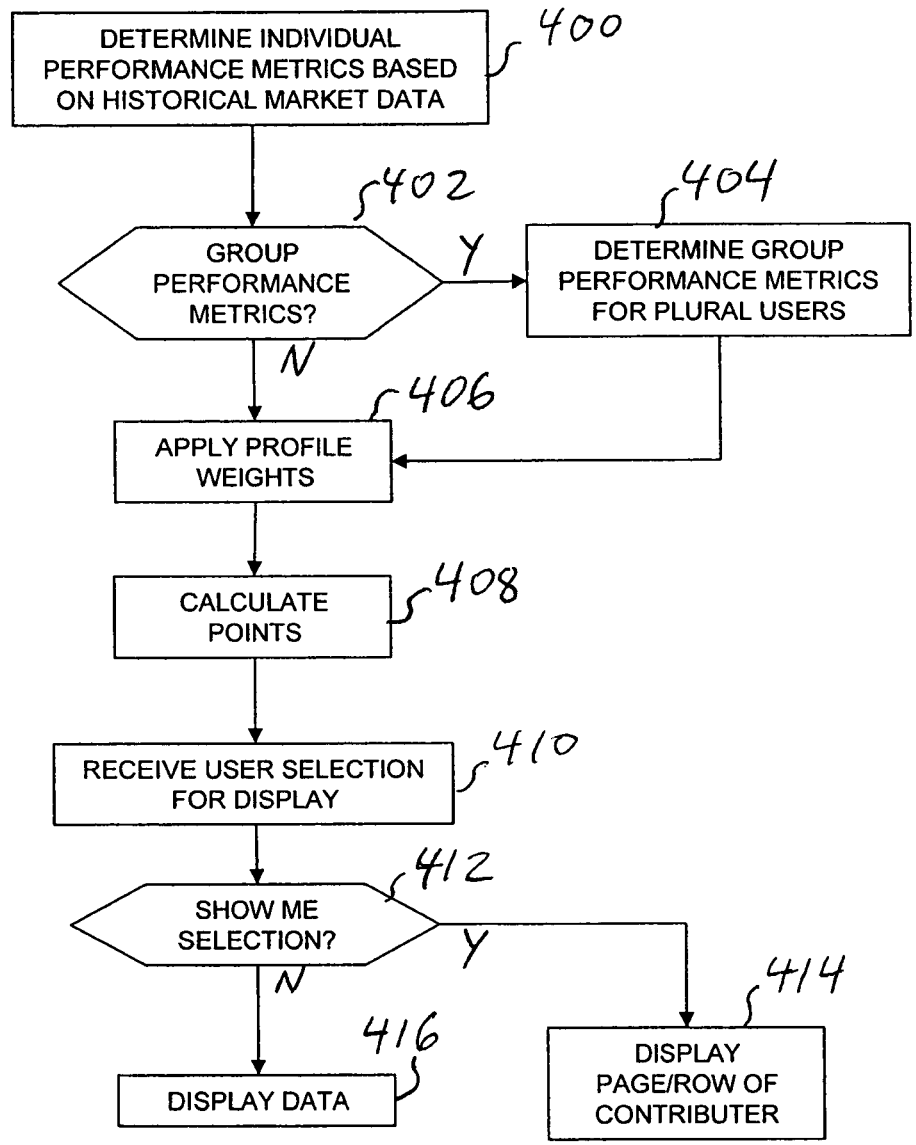
FIG. 4 is a flowchart illustrating an exemplary method of analyzing the financial data of individual contributors and groups of contributors, according to an embodiment of the present invention.

FIG. 4 is a flowchart illustrating an exemplary method of analyzing the performance of individual contributors and groups of contributors using data analyzer 116, according to an embodiment of the present invention. In step 400, individual performance metrics are determined based on historical market data, for example, by individual performance metrics processor 302 (FIG. 3). In step 402, it is determined whether group performance metrics are to be calculated. If it is determined to calculate group performance metrics, step 402 proceeds to step 404. In step 404, group performance metrics are determined for plural users, for example by group performance metrics processor 306 (FIG. 3), and step 404 proceeds to step 406. If it is determined not to calculate group performance metrics, step 402 proceeds to step 406.

In step 406, profile weights are applied to the group performance metrics (or individual performance metrics), for example, by profile weight generator 308 (FIG. 3). In step 408, an aggregate point score is calculated from the weighted performance metrics, for example by points generator 312 (FIG. 3).

In step 410, a user selection is received for displaying at least one of the weighted performance metrics, individual performance metrics, group performance metrics, and/or the aggregate point score, for example via user interface 122 (FIG. 1). In step 412, it is determined whether the user selection includes a "Show Me" selection. If the "Show Me" function is selected, step 412 proceeds to step 414. In step 414, a page/row of the contributor is displayed, for example, as shown in FIG. 5B.

If the "Show Me" function is not selected, step 412 proceeds to step 416 and the selected data is displayed without displaying the page/row of a particular contributor, for example, as shown in FIG. 5A.

Figure 6:
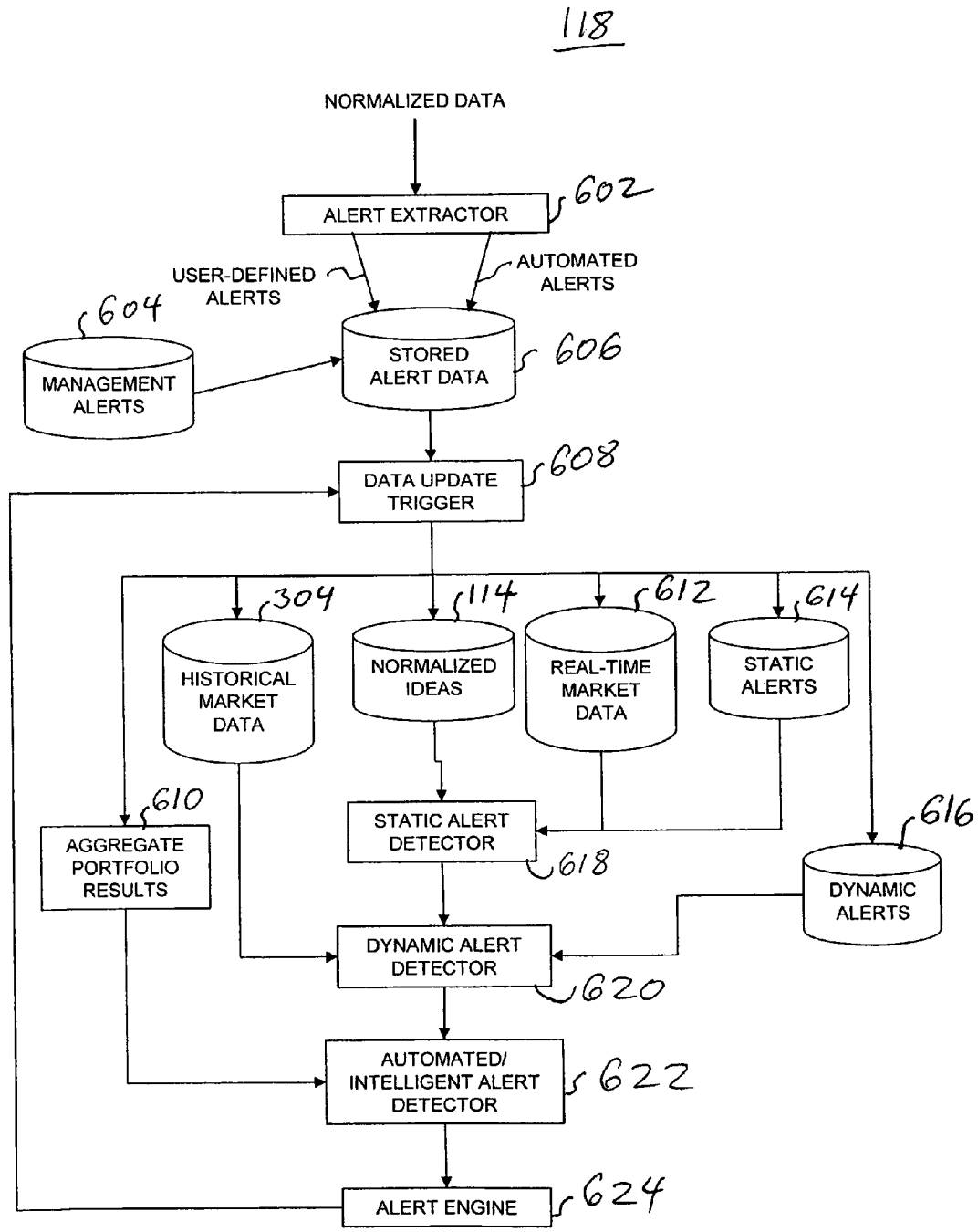
FIG. 6 is a block diagram of an alert system of the exemplary notional portfolio tracking system shown in FIG. 1, according to an embodiment of the present invention.

FIG. 6 is a block diagram of alert system 118 of exemplary portfolio tracking system 106 according to an embodiment of the present invention. Alert system 118 includes alert extractor 602, data update trigger 608, static alert detector 618, dynamic alert detector 620, intelligent alert detector 622 and alert engine 624. Alert system 118 provides alerts to user device 108 depending upon static, dynamic and other alerts detected based on the normalized ideas stored in memory 114, aggregate portfolio results 610, historical market data 304, real-time market data 612, alert data in static alert database 614 and alert data in dynamic alert database 616. Accordingly, alert system 118 signals a contributor when the execution of instructions related to the financial data of the contributor achieves at least one result.

Alert system 118 includes an alert mechanism which provides alerts independent of the rate at which contributors log into the system or enter ideas to the system, because alerts can be triggered by numerous inputs. The alerts may include user-defined static alerts, based on the actual idea itself, discussed below. The alerts may also include dynamic alerts and/or relative alerts. The alerts may also be a function of market movement and may be a function of the aggregate information that is available plus the portfolios of all contributors.

Alert system 118 includes an alert extractor 602 to extract user-defined static alert data based on the normalized data, from data normalizer 110 (FIG. 1). Alert extractor may also add automated alert data, described further below, in addition to the user-defined static alert data in memory 606. The alert data may further include management alert data received from memory 604.

Static alert data may be determined from the idea goals of each contributor 102. The static alert data may be developed into static alert threshold(s) as well as used to set a time criteria. Static alert thresholds may be developed, for example, from the stop loss, the target price and/or the target time frame. The time criteria may be developed, for example, if the idea has not been amended or closed in a certain period of time. Accordingly, even if the user-defined alert threshold hasn't been reached, an alert may be generated. The contributor may have also set overall portfolio guidelines. For example, the contributor may want to be alerted if any of his ideas moves more than a predetermined percentage in one day in either direction or if the value of the entire portfolio moves, in the aggregate, more than a certain percentage (usually a percentage that is less than the percentage threshold used for individual positions). These types of alerts are either fully static or alerts that only need to know the price of that stock and the contributor's idea itself.

A static alert is fixed at the time the idea was entered. For example, if an individual is buying IBM stock with a goal to sell it when it gets to $120 per share, this information may be used to create a static alert. The alert is static because however much time goes by and however the market moves in the interim, the alert relates to a fixed number, i.e. $120 per share. Alert engine 624, described further below, compares the new price with every static alert at every tick of the quote ticker, or anytime there is a new IBM share price. Typically, static alerts tend to be an absolute price and an absolute time. More efficient mechanisms may be employed that link alerts to specific symbols and only reevaluate those alerts related to the specific symbol of the alert.

There are also relative alerts that may be independent of the contributor's idea. For example, although the individual is going to buy IBM at $100 per share and exit the holding at $120 per share, the individual may want to be alerted if the stock price moves in either direction more than 5% in any one day. This may be a very substantial move for that stock which may be an indication for the contributor or for the client, who is watching that idea, that something important, perhaps unexpected, was taking place in the market.

The alert data in memory 606 can be stored and potentially put into an overlay of system wide standard relative alerts, such as percentage movements in a day or absolute movement in a day. In addition, other static alerts may be included which relate to a contributor's management of an active idea. For example, a contributor 102-1 that previously entered an idea may set up a static alert if the idea has not been amended or closed in over 20 days or 30 days.

Alert system 118 also uses intelligent alerts and automated alerts that bring in additional information about an individual's entire portfolio, about all contributors portfolios and about the behavior of the market in general. Accordingly, intelligent alerts may go beyond what alerts each contributor could individually request, because there are an infinite number of permutations and the contributor may not know which parameters to set.

Alert system 118 includes alert engine 624 that reviews results from static alert detector 618, dynamic alert detector 620 and automated/intelligent alert detector 622, to run constantly, evaluating with the passage of time whether any alert thresholds have been triggered. The frequency of evaluation may be the shorter of a minimum desired time interval (for example, one second) and an asynchronous input of the next external data item to the system. If alert engine 624 does re-evaluate more often than once per hour, then no alert can be triggered in less than an hour. Then, on average, perhaps each alert would be half an hour late, but some may be fifty nine minutes and fifty nine seconds late. Accordingly, it is understood that there is a trade off on how frequently data is reevaluated and the latency between a threshold being crossed and an alert being triggered. Further, it is possible that a trigger threshold may be crossed in between samples. In such a situation, the trigger condition may not actually be met at the next sample period. Thus an alert will be missed unless the system evaluates alerts against all events in the elapsed period.

A maximum speed for reevaluating the data may be driven by how quickly events in the outside world change. In many types of entry systems 104, ideas may be received once or twice a day per contributor, such that there may be tens or hundreds of times a day that ideas will be received for all. The market itself, however, has frequent ticks. For example, a quote for IBM can change every millisecond. Thus, there is a trade off as to how often alert engine 624 may perform a reevaluation. A one second interval or the next time a contributor 102 enters an idea or a tick associated with the contributor idea is entered may be a reasonable interval. In any case, when alert engine 624 starts reevaluating the data, alert engine 624 takes external data items, including ticks from quote feeds which provide information on every trade in a security as well as updates from contributors to their ideas and finally, every time a user evaluates the portfolio.

Alert engine 624 controls data update trigger 608, such as a clock signal, to update data in dynamic alert database 616, static alert database 614 and normalized idea memory 114. These three sets of data are defined by the contributor when they enter an idea or by a manager who modifies one or more parameters in the normalized ideas. These three sets of data typically do not change that often on an individual idea basis. When there are thousands of users, however, one or more values may change every couple of seconds. In addition, real-time market data 612, aggregate portfolio results 610 and historical market data 304 are also updated. Real time market data 612 and aggregate portfolio results 610 may change at a very high frequency, such as every time every tick comes in.

When data update trigger 608 updates the various data sets, a recalculation of the portfolio results for each portfolio is initiated. New data may be received for real time market data 612, may be received for updating the static alert database 614 and may be received for updating normalized ideas stored in memory 114 or dynamic alert database 616. Historical market data may be updated by transferring the prior tick from the real time market data 612 to the historical market data 304. The aggregate portfolio results 610 may be updated by the use of historical market data 304, normalized ideas from memory 114, real-time market data 612, static alerts from static alert database 614 and dynamic alerts from dynamic alert database 616. That data may be used to recalculate the value of every idea in every portfolio and every portfolio's results. The aggregated data for all the different portfolios may be used in automated/intelligent alert detector 622.

Static alert detector 618 receives the normalized ideas from memory 114, real-time market data 612 and the static alerts in static alert database 614 and evaluates the static alerts. Static alert detection receives as inputs the static alerts, where the inputs may include a stop loss price, a target price and/or a target time frame. Static alert detector 618 also uses real-time market data 612 and the normalized ideas and performs Boolean checks to determine if any of the alert conditions have been met. If so, an alert trigger flag is set associated with the particular static alert.

For example, contributor 102-1 has an idea to buy shares of IBM and to sell them when they reaches $120 per share. Static alert detector 618 evaluates the current tick of IBM and determines that it is $115 per share. Thus, the current price has not met the target and no alert is set. A few ticks later, the price of IBM may go to $120.25 per share and static alert detector 618 compares that price against the target $120 per share and sets the alert flag for the static target price reached.

Dynamic alert detector 620 receives the normalized ideas from memory 114, real-time market data 612, the static alerts in static alert database 614, historical market data 304, as well as dynamic alerts in dynamic alert database 616 and evaluates dynamic alerts. Dynamic alert detector 618 examines relative movements up or down that exceed a defined threshold per unit of time. For example, dynamic alert detector 618 does not evaluate whether IBM reaches $120 per share. Instead, dynamic alert detector 618 evaluates a rate of movement (e.g., if IBM starts moving quickly), either up or down. For example, there may be a price target of $150 per share and IBM is only trading at $100 per share, but a dynamic alert may be appropriate because IBM has transitioned from $110 per share to $100 per share in today's trading, dropping about ten percent. The ten percent change in either direction may be set as the dynamic alert threshold.

One aspect of dynamic alerts is that it is also appropriate to set these alerts, portfolio-wide, not just individual idea-wide. A dynamic alert may be set on the IBM idea, but many contributors may want to examine, for all of an individual's ideas, whether those ideas move more than five percent in either direction in any one day. There may also be account managers who monitor their contributors and who want to know if any contributors may potentially achieve poor realization with their ideas and/or are not adequately monitoring and servicing their ideas. The account manager may, for example, set a ten percent movement threshold to receive alerts on any contributor whose idea results in a value decrease of five percent in one day or 10% since they entered it. In this manner, the manager may focus on the individuals with ideas that may require attention. Another form of a dynamic alert is based on an elapsed time from when each idea has been last amended. If any dynamic alert conditions are met, dynamic alert detector 620 triggers a dynamic alert flag to be set.

Automated/intelligent alert detector 622 takes all of the prior data (the normalized ideas from memory 114, real-time market data 612, the static alerts in static alert database 614, historical market data 304, and dynamic alerts in dynamic alert database 616) and additionally aggregate portfolio results 610 to provide feedback to the contributors, the managers and the users of this data of important information that is related to the ideas that have been shared. Automated/intelligent alert detector 622 uses all of the above inputs for each contributor idea and all contributors to provide alerts based on a clustered behavior.

Automated alerts can be set by automated/intelligent alert detector 622 based on comparing individual ideas to groups of ideas, individual portfolios to groups of portfolios, or to market movements as a whole. For example, an intelligent alert may be triggered if any individual portfolio falls behind a defined threshold of the larger group. As one example, alerts may be triggered on a portfolio if the number of ideas in the portfolio drops to be in the bottom ten percent of all portfolios for all contributors. As another example, alerts may be triggered if the return on a portfolio is in the bottom third, for example, or if no changes have been made in any one portfolio for longer than other contributors. These types of alerts are possible with alert system 118 and useful in conjunction with access to the aggregate information and the individualized information of all other portfolios.

Accordingly, the entire database of contributors may be used to constantly monitor metrics, for example, the return and/or the frequency of the ideas of the contributors. Based on the monitored metrics, statistics, such as a standard deviation, of the contributors on each metric may be developed. The statistics may then be used as a basis for intelligent triggers that signal, for example, when a contributor is more than one standard deviation below or above other contributors with respect to any of the measured metrics.

Intelligent alerts may also be set by automated/intelligent alert detector 622. They consist of examining each idea and each portfolio for comparisons to the larger group of contributors. As one example, if a contributor has an idea (such as to buy shares of IBM) and that idea is shared by other contributors, an alert would be sent to each contributor with a similar idea when one contributor closes his or her idea. Further, when a contributor enters a sell idea for IBM, all contributors with buy ideas would be alerted. Intelligent alerts take a global view of all contributors, all ideas, the market sectors and geographies in order to provide useful, unique feedback to contributors based on an intersection of the wider informational event and an idea in an individual contributor's portfolio.

The intelligent alert is a way of benefiting from having aggregated all of the information on all of the portfolios. Accordingly, the more contributors there are, the more overlap there may be in terms of style, in terms of overall market exposure and in terms of specific ideas. By acknowledging the availability of all of this information, automated/intelligent alert detector 622 can develop alerts that share valuable information across the user community.

For example, if one contributor has an idea regarding IBM, the contributor may want to know when anyone else becomes involved with IBM and when they become disinterested with IBM. The contributor may want to know, over time, does he tend to be very early in opening an idea in IBM or late compared to his peers. This type of information may give the contributor insight in real-time as to what his peers across the world are thinking of when developing similar ideas.

Over time, this information may also give the contributor the ability to determine that he tends to invest in ideas that very few others do or tends to invest in ideas that may others do. For example, a contributor can determine whether he is typically early or late, because he always receives alerts that other people are leaving ideas before he has and is always getting alerts that other people have entered an idea that he already has. The intelligent alerts may give the contributor a signal he tends to buy earlier and sell later than anyone else. The contributor may use that alert to examine those people who invest in similar ideas and try to understand how their performance relates to his performance and make any remedial changes to his behavior.

Alert engine 624 evaluates whether any of the static, dynamic, and/or automated/intelligent alert flags have been set and causes transmitter 124 (FIG. 1) to signal at least one of the contributors (and/or users) with at least one appropriate alert corresponding to the set flag(s). The at least one alert represents execution of instructions (or use of parameters relating to performance of transactions) for at least a portion of the normalized financial data to achieve a result.

Figure 7A:
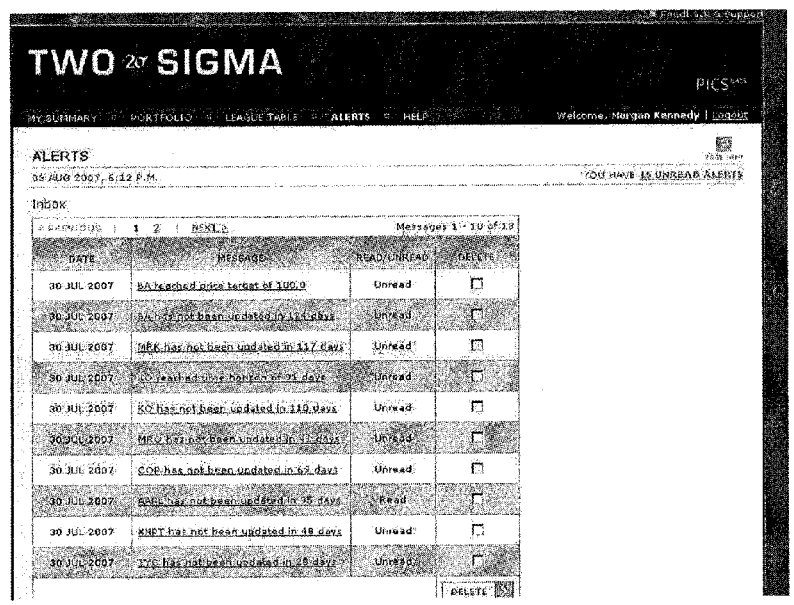
Figure 7B:
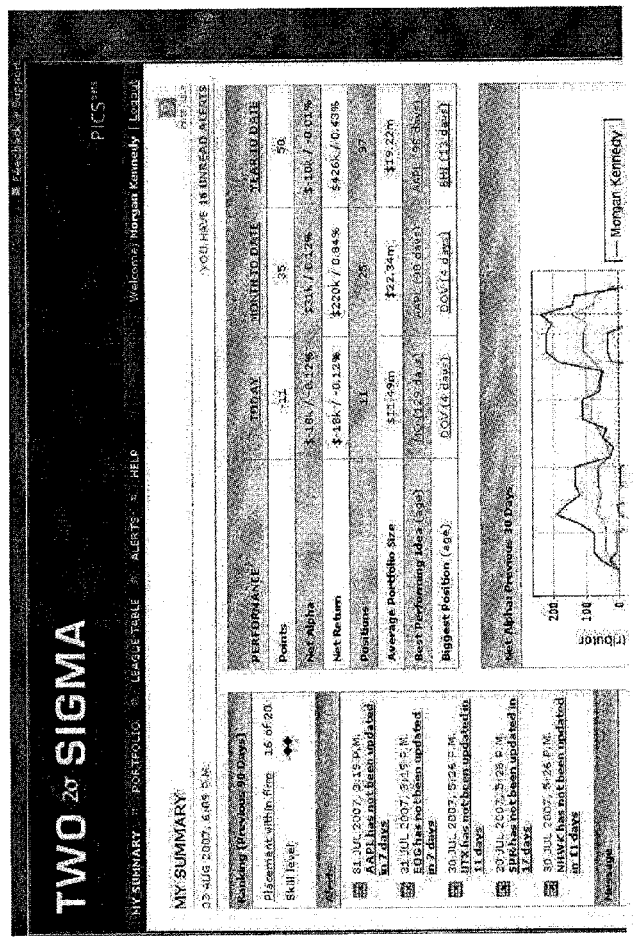
Figure 7C:
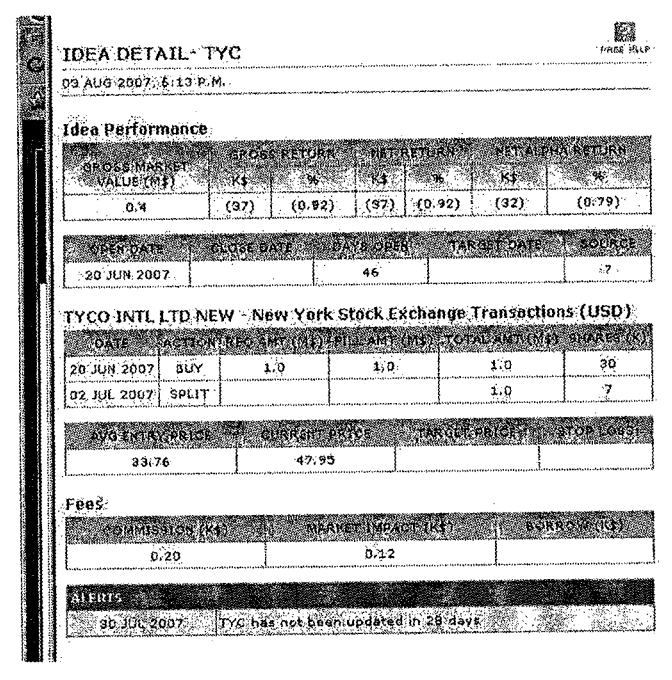

FIGS. 7A, 7B and 7C are example displays of alerts to a user, according to an embodiment of the present invention. As shown in FIG. 7A, alerts may be provided on one display as a series of messages to be read. As shown in FIG. 7B, alerts and performance data may each be presented as part of a summary performance on a single display. As shown in FIG. 7C, detailed information on a specific idea, as well as any alerts may be provided on a single display.

Figure 8:
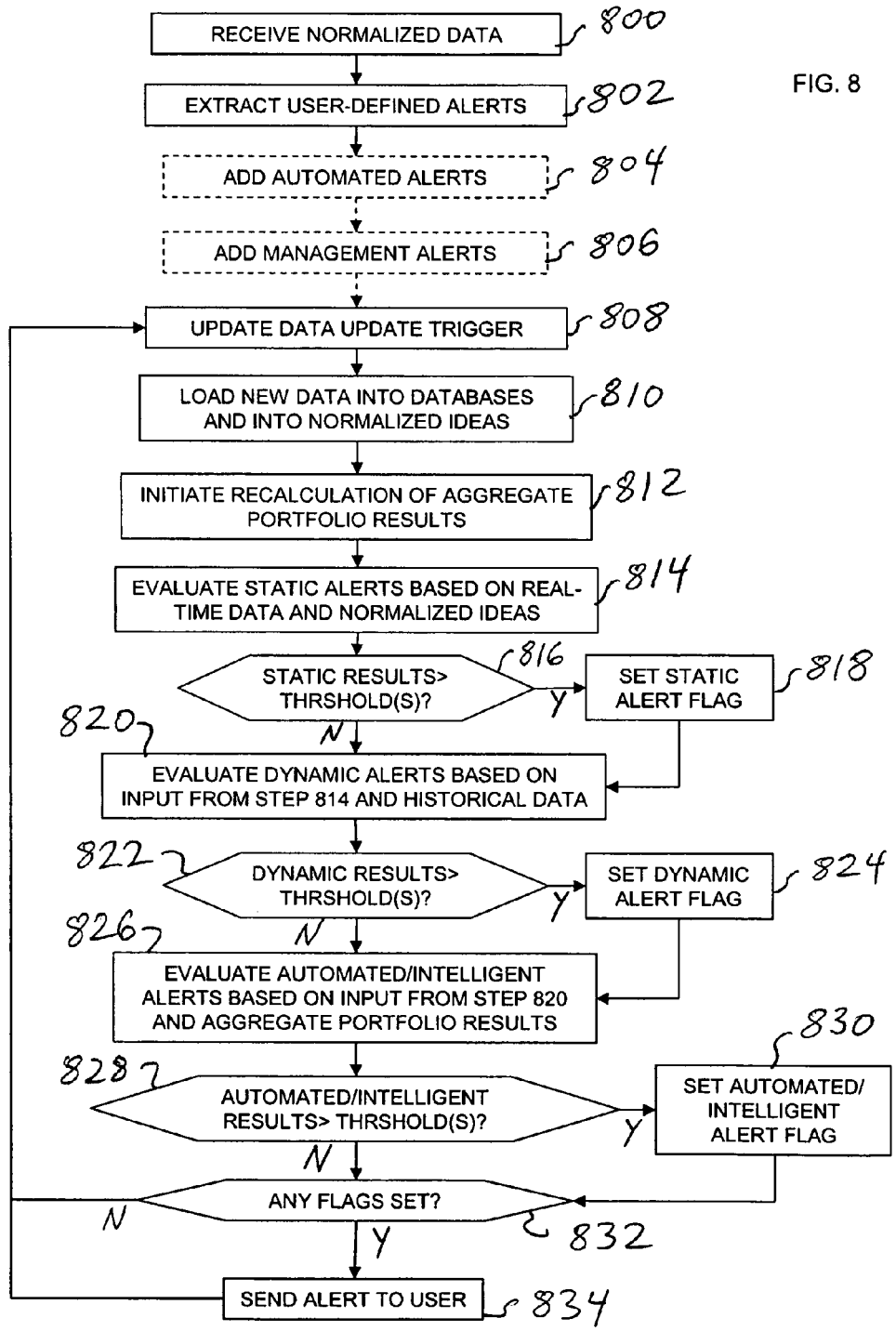
FIG. 8 is a flowchart illustrating an exemplary method of generating alerts for signaling when the execution of instructions related to the financial data of at least one contributor achieves a predetermined result, according to an embodiment of the present invention.

FIG. 8 is a flowchart illustrating an exemplary method for signaling when the execution of instructions related to the financial data of at least one contributor achieves a predetermined result, according to an embodiment of the present invention. The steps illustrated in FIG. 8 merely represent an embodiment of the present invention. It is understood that certain steps may be eliminated or performed in an order different from what is shown. In step 800, normalized data is received, for example, from data normalizer 110 (FIG. 1). In step 802, user-defined static alerts are extracted from the normalized data, for example, by alert extractor 602 (FIG. 6). In step 804, automated alerts may optionally be added to the user-defined static alert data. In step 806, management alerts may optionally be added, for example from stored management alerts in memory 604 (FIG. 6).

In step 808, a trigger to update data in different databases, the normalized ideas and aggregate portfolio results is set, for example by alert engine 624 (FIG. 6) that controls data update trigger 608. In step 810, new data is loaded into real-time market database 612, historical market database 304, static alert database 614, dynamic alert database 616 and the normalized ideas stored in memory 114 (FIG. 6). In step 812, recalculation of aggregate portfolio results is initiated for each portfolio.

In step 814, static alerts are evaluated based on real-time data and normalized ideas. In step 816, if the evaluated static alerts are greater than a static alert threshold(s), step 816 proceeds to 818 and a static alert flag is set. Step 818 proceeds to step 820. If the static alert results are less than or equal to static alert threshold(s), step 816 proceeds to step 820.

In step 820, dynamic alerts are evaluated based on information received in step 814 and historical market data for example, from historical market data 304 (FIG. 6). In step 822, if the dynamic alert results are greater than a dynamic result threshold(s), step 822 proceeds to step 824 and a dynamic alert flag is set. Step 824 proceeds to step 826. If the dynamic alert results are less than or equal to the dynamic alert threshold(s), step 822 proceeds to step 826.

In step 826, automated and intelligent alert results are compared to the information received in step 820 and aggregate portfolio results 610 (FIG. 6). In step 828, if the automated/intelligent alert results are greater than an automated/intelligent alert threshold(s), step 828 proceeds to step 830 and a automated/intelligent alert flag is set. Step 830 proceeds to step 832. If the automated/intelligent alert results are less than or equal to the automated/intelligent alert threshold, step 828 proceeds to step 832.

It is understood that any of the static alert steps (814-818), the dynamic alert steps (820-824) and the automated/intelligent alert steps (826-830) may be performed in an order different from what is shown or eliminated. For example, if any one of the alert flags are set, a flag setting step (steps 818, 824 and/or 832) may proceed to step 832. Accordingly, although steps 818, 824 and 830 are shown in FIG. 8 as proceeding to respective steps 820, 826 and 832, it is understood that any one of steps 818, 824 and 830 may proceed to step 832.

In step 832, it is determined whether any of the static, dynamic and automated/intelligent alert flags are set. If at least one of the flags is set, step 832 proceeds to step 834 and an alert is sent to a user, for example via user device 108 (FIG. 1). Step 834 proceeds to step 808 and the process of steps 808-834 is repeated. If no alert flags are set, step 834 proceeds to step 808 and the process is repeated for steps 808-834.

Referring back to FIG. 1, one or more entry systems 102 may include online platform 126 that allows a contributor 102 to enter ideas, amend ideas, close ideas, review ideas and confirm different actions regarding ideas (e.g., confirm the closing of an idea). Referring next to FIGS. 9A-14C, different screen layouts for online platform 126 are described below.

Figure 9A:
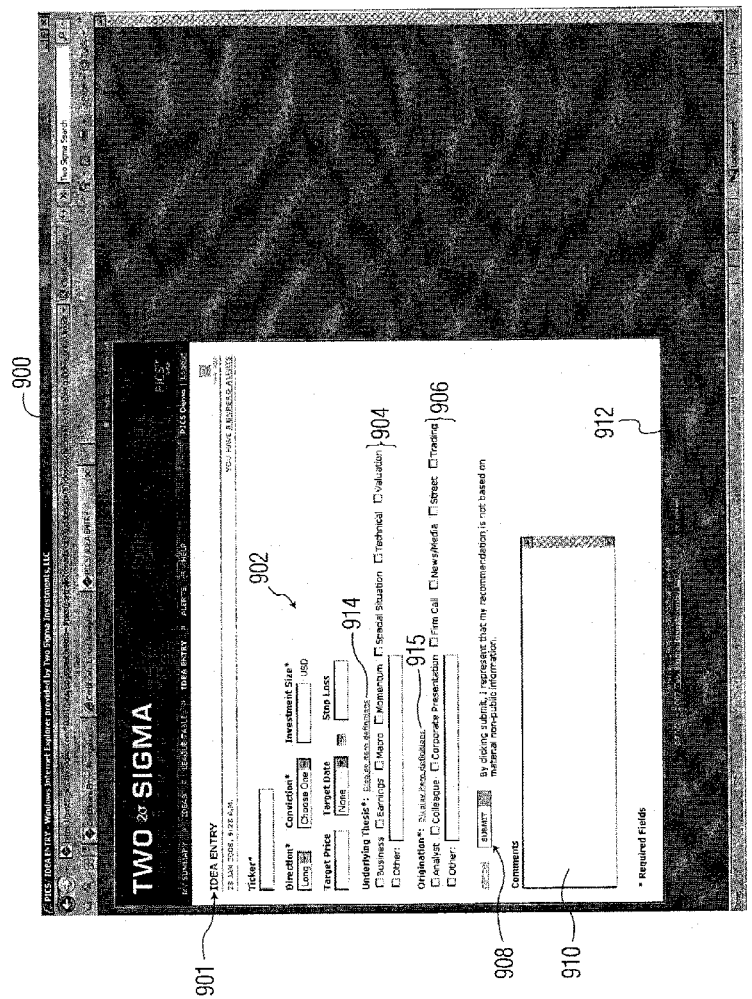
FIGS. 9A and 9B are examples of idea entry screen layouts, according to embodiments of the present invention.
Figure 9B:
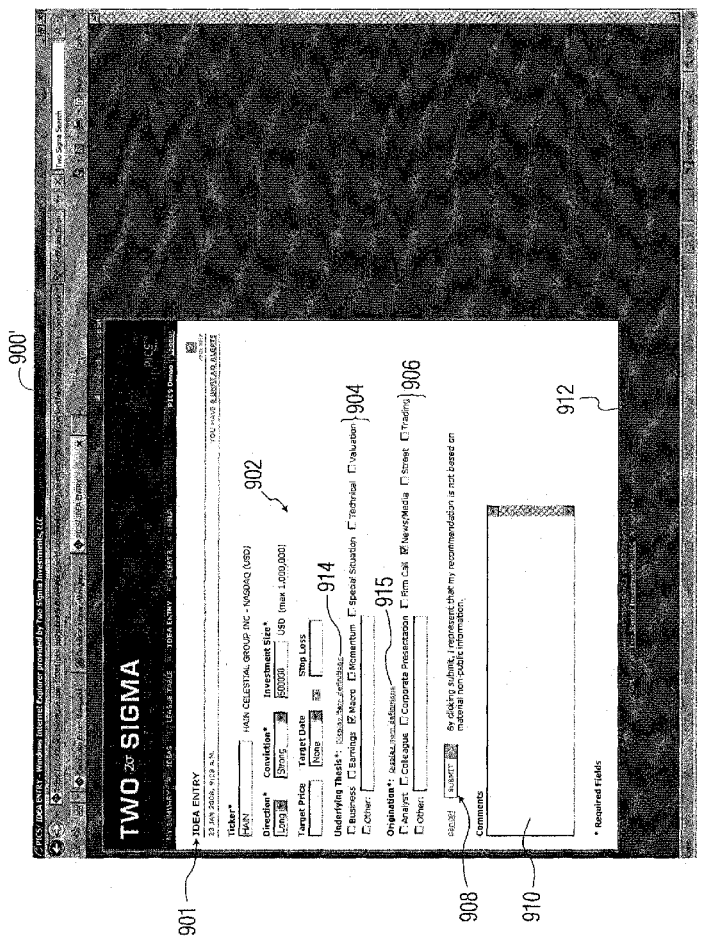

Referring to FIG. 9A, an exemplary idea entry screen layout 900 is shown. Idea entry screen layout 900 includes title 901, idea parameter entry region 902 for entering idea entry parameters, thesis region 904 for entering underlying idea theses, origination region 906 for entering idea sources, submission region 908 for submitting or canceling an idea and comments region 910 for entering comments. For example, referring to FIG. 9B, idea entry screen layout 900' is shown with data entered respectively in idea parameter entry region 902, thesis region 904 and origination region 906.

Referring back to FIG. 9A, idea parameter entry region 902 may include parameters including a ticker symbol entry associated with a security, a desired direction for the idea (for example, long or short), a conviction strength for the idea (for example, very strong, strong, medium) and an investment size for the idea. The idea parameters may also include a target price, a target date and a stop loss price for an idea. A selected target date may, optionally, be displayed separately from the target date parameter entry box. It is understood that other parameters may be included in idea parameter entry region 902. Some of the idea parameters may be required for entry, as indicated by the "*" symbol, whereas other idea parameters entries may be optional. It is contemplated that the parameters required for data entry may be grouped together on idea entry screen layout 900.

In an exemplary embodiment, thesis region 904 may include underlying idea thesis selections associated with business, earnings, macro, momentum, special situations, technical, valuation and other selections. The business selection relates to ideas associated with business events or conditions, for example, a management change, a new product, etc. The earnings selection relates to ideas associated with publicly available information about earnings of a financial instrument. The macro selection relates to ideas associated with a broader sector or market thesis, for example, a change in a regulatory environment, a rise or fall of commodities prices, a cyclicality, etc. The momentum selection relates to ideas associated with expecting a financial instrument to continue a current trend. The special situation selection relates to ideas associated with announced or speculative corporate or securities restructuring and anomalies, for example, mergers and acquisitions, buybacks, spin-offs, rights offering, etc. The technical selection relates to ideas associated with price patterns and predicted movement trends. The valuation selection relates to ideas associated with a company that is undervalued or overvalued. The other selection allows respective contributor 102 to enter a short idea thesis.

Origination region 906 includes selections indicating the origination of the idea. The selections include an analyst, a colleague, a corporate presentation, a firm call, news/media, a street, trading and from an other source of origination. The other selection in origination region 906 allows respective contributor 102 to enter a short idea source of origination.

Submission region 908 includes a submission selection and a cancellation selection. In an exemplary embodiment, the submission selection and the cancellation selection are presented on idea entry screen layout 900 with different presentation styles and/or different font sizes to emphasize different selection weights. For example, the cancellation selection may be presented as a text link whereas the submission selection may be presented as a button.

Idea entry screen layout 900 may include a roll-over tool such that an idea thesis term or idea origination term definition may be presented when a cursor moves over the corresponding underlying idea thesis or idea source of origination. Idea entry screen layout 900 may also include links 914, 915 for displaying respective thesis and origination definitions on a separate screen. For example, by selecting link 914 for thesis definitions, a screen (not shown) may be provided with the corresponding definitions for the thesis terms. In addition, the thesis and origination definitions may also be linked to a help screen (not shown).

Idea entry screen layout 900 may include virtual fold 912 associated with a 1024×768 screen resolution. Idea parameter entry region 902, thesis region 904, origination region 906 and submission region 908 may be provided above virtual fold 912. Comments region 910 may be provided above or below virtual fold 912. In this manner, contributor 102 may view the relevant information without scrolling down screen layout 900.

Figure 10A:
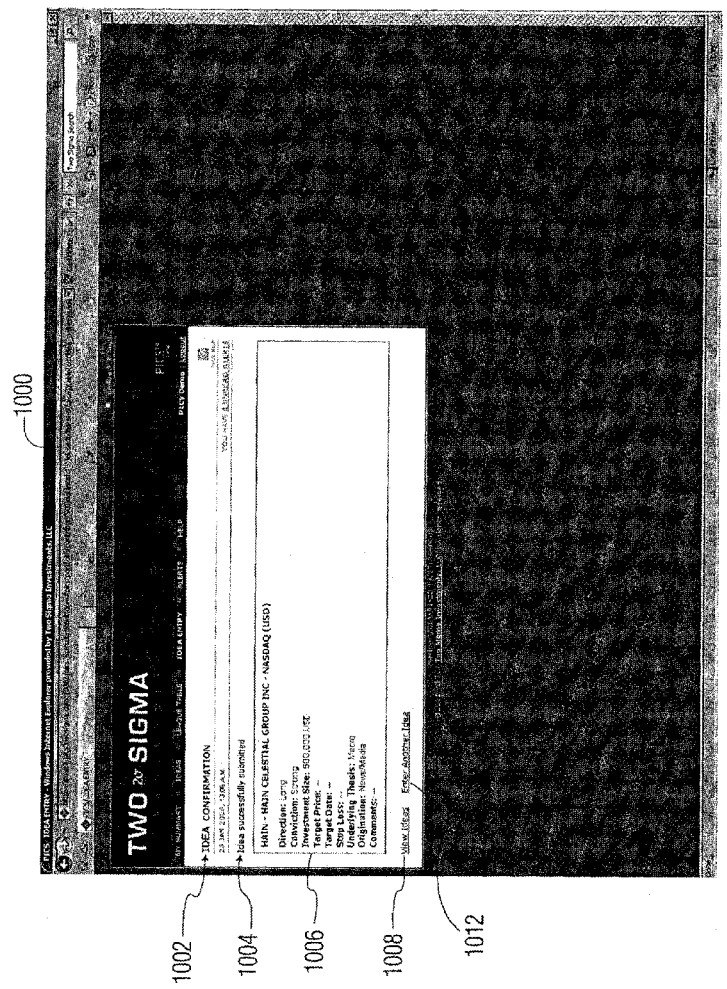
FIGS. 10A, 10B and 10C are examples of confirmation screen layouts, according to embodiments of the present invention.

Referring to FIG. 10A, an exemplary confirmation screen layout 1000 for idea entry is shown. Confirmation screen 1000 includes title 1002, confirmation text 1004 and summary section 1006 that presents a summary of the selected idea, thesis and origination parameters, for example, input via idea entry screen layout 900 (FIG. 9A). Confirmation screen layout 1000 may also include links, such as view ideas link 1008 to view details about a specific idea and enter another idea link 1012 to enter a new idea not previously entered. Although not shown, it is contemplated that confirmation screen layout 1000 may also include an amend idea link to amend a previously submitted idea. Optionally, parameters that are not selected may be shown in summary section 1006 as a blank area. For example, referring to FIG. 12, selecting view ideas link 1008 may provide idea screen layout 1200 for viewing details about a specific idea.

Figure 10B:
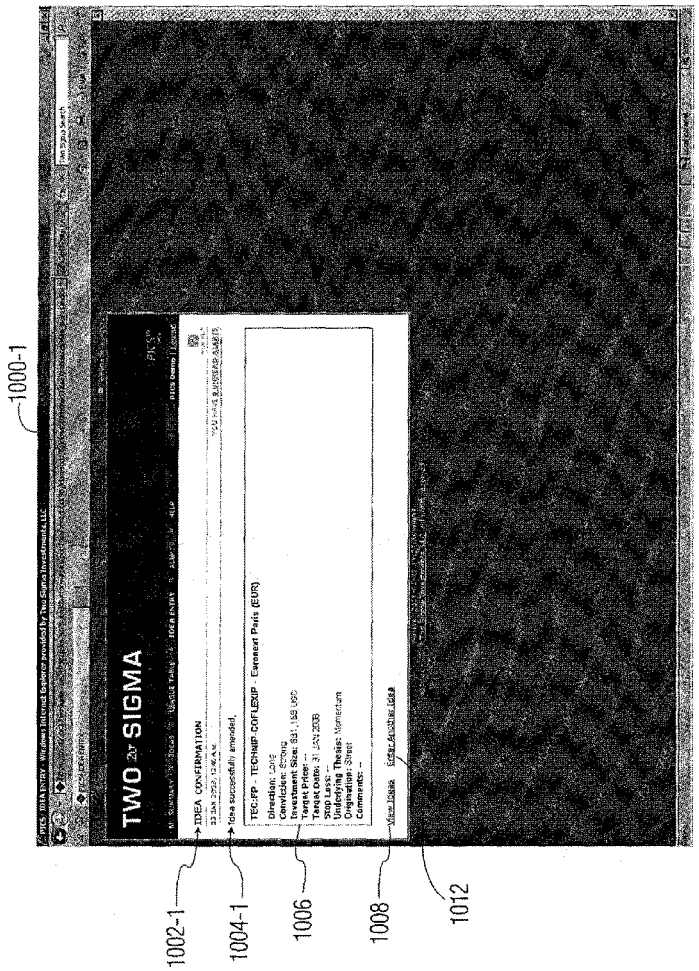

Referring to FIG. 10B, a confirmation screen layout 1000-1 is shown for an amended idea (amending ideas described below with respect to FIG. 11A). Confirmation screen layout 1000-1 is similar to confirmation screen layout 1000 except that confirmation text 1004 is replaced by text 1004-1 associated with an amended idea.

Figure 10C:
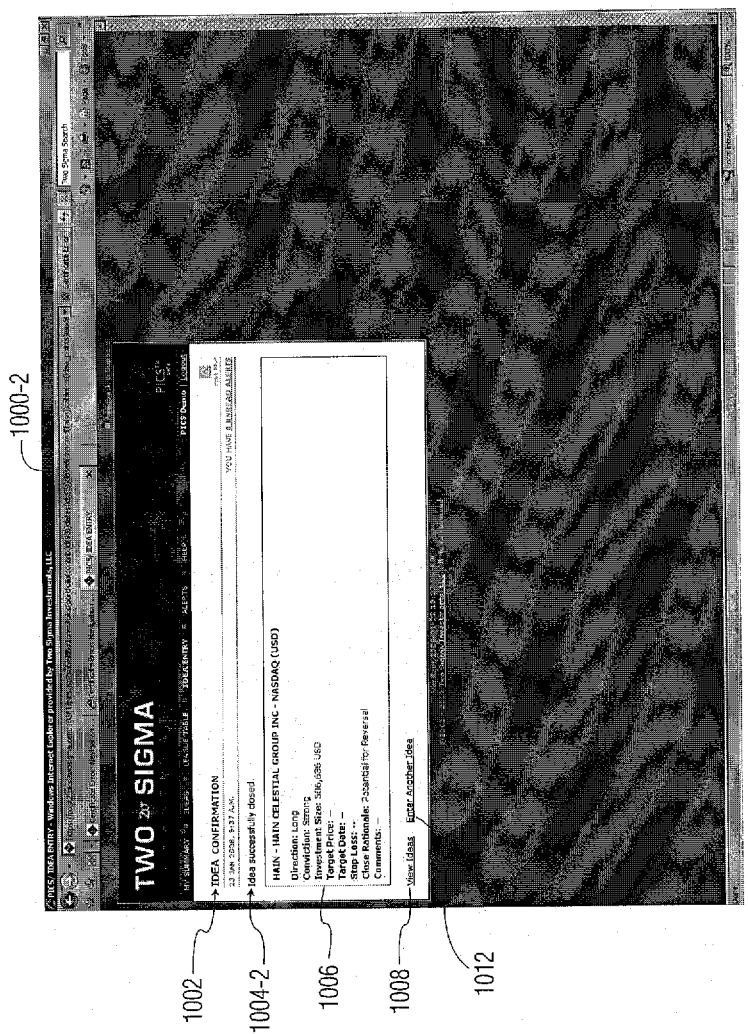

Referring to FIG. 10C, a confirmation screen layout 1000-2 is shown for a closed idea (closed ideas described below with respect to FIG. 11B). Confirmation screen layout 1000-2 is similar to confirmation screen layout 1000 except that confirmation text 1004 is replaced by text 1004-2 associated with a closed idea.

Figure 11A:
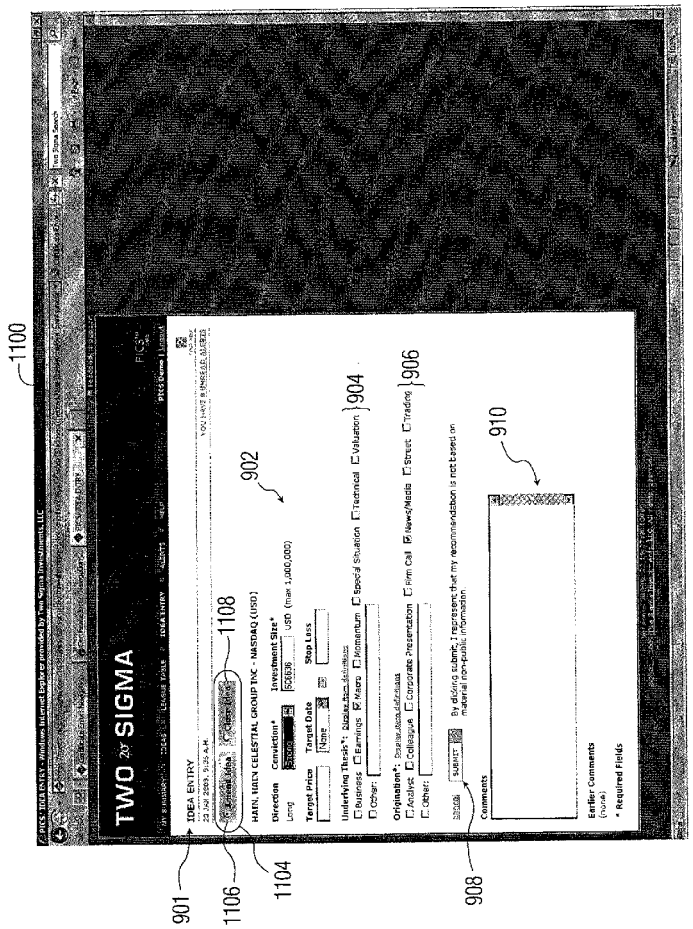
FIGS. 11A and 11B are examples of respective amend idea and closed idea screen layouts, according to embodiments of the present invention.

Referring to FIG. 11A, amend idea screen layout 1100 is shown. Amend idea screen layout 1100 is similar to idea entry screen 1000, except that it includes region 1104 for amending or closing an idea. For example, region 1104 may include amend selection 1106 and close selection 1108. In an exemplary embodiment, amend idea screen layout 1100 is initially presented for both amendment of and closing of a previously entered idea.

Previously selected idea parameters may be presented in idea parameter entry region 902, thesis region 904 and origination region 906. In addition, previously entered comments may be displayed as part of comments region 910.

Figure 11B:
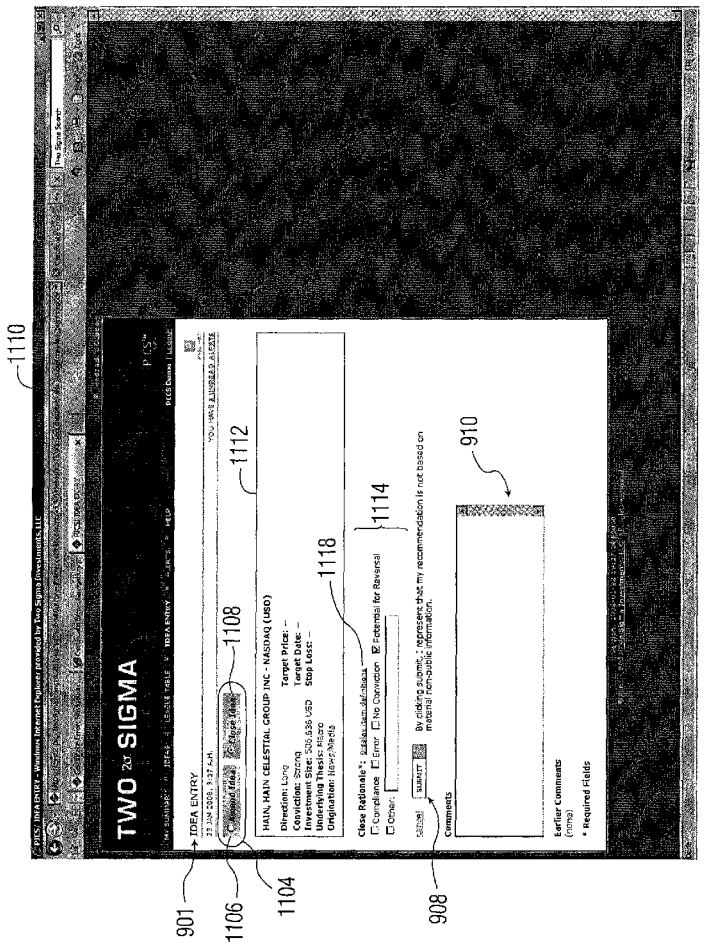

Referring now to FIG. 11B, close idea screen layout 1110 is shown. Close idea screen layout 1110 is similar to amend idea screen layout 1100 except that idea parameter entry region 902, thesis region 904 and origination region 906 are replaced by closed idea summary 1112 and rationale selection region 1114. In an exemplary embodiment, when an idea is selected to be amended or to be closed, amend idea screen layout 1100 (FIG. 11A) is initially presented. If an idea is selected to be closed, amend idea screen layout 1100 (FIG. 11A) is replaced by close idea screen layout 1110.

Rationale selection region 1114 may include any suitable parameters for indicating a rationale for closing an idea. The parameters in region 1114 may include, for example, a compliance of an idea, an error of an idea, no conviction of an idea, a potential for reversal of an idea and other reasons. The other reasons selection allows respective contributor 102 to enter more information regarding a rationale for closing an idea.

Close idea screen layout 1110 may also include a roll-over tool such that a rationale term definition may be presented when a cursor moves over the corresponding rationale and/or may include a link 1118 for displaying rationale definitions on a separate screen (not shown). In addition, previously entered comments may be displayed as part of comments region 910.

Figure 13A:
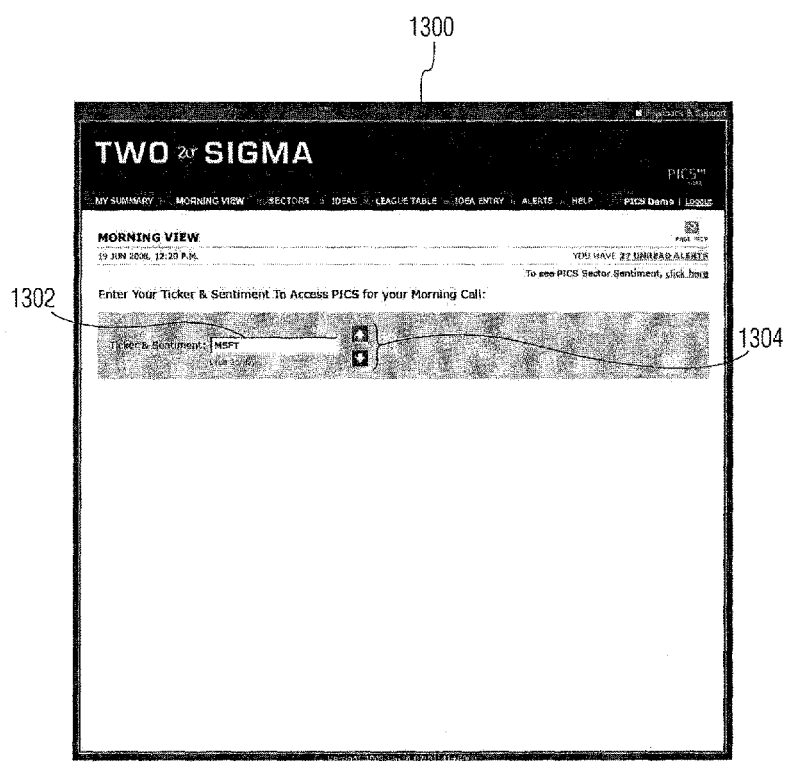
FIGS. 13A, 13B and 13C are examples of idea vetting screen layouts, according to embodiments of the present invention.
Figure 13B:
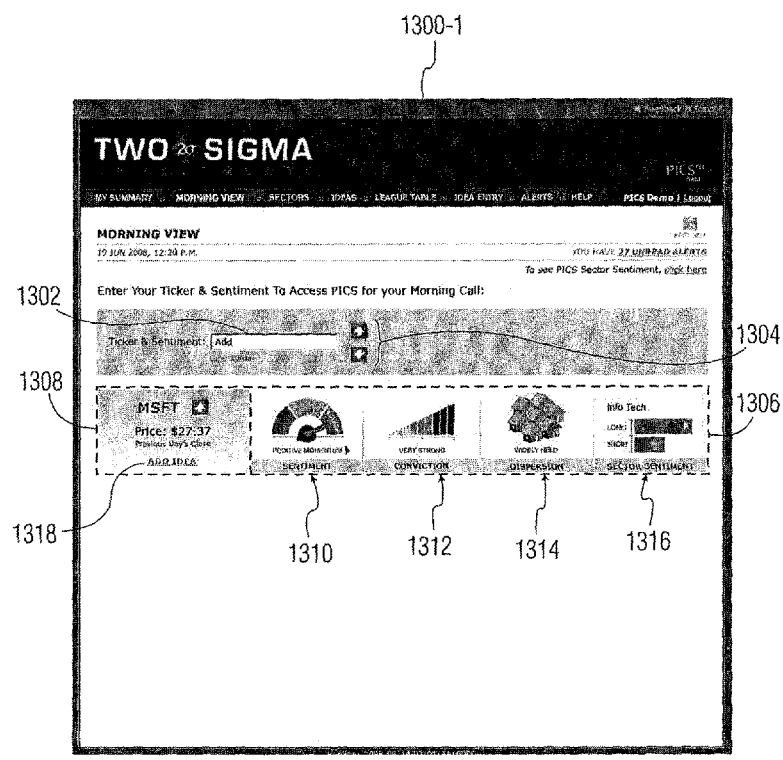
Figure 13C:
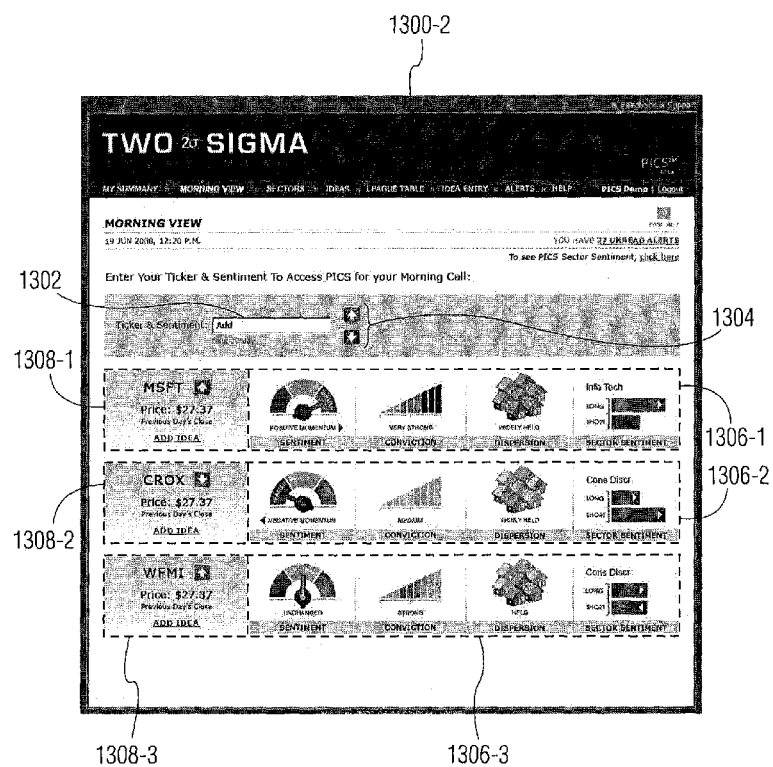
Figure 14A:
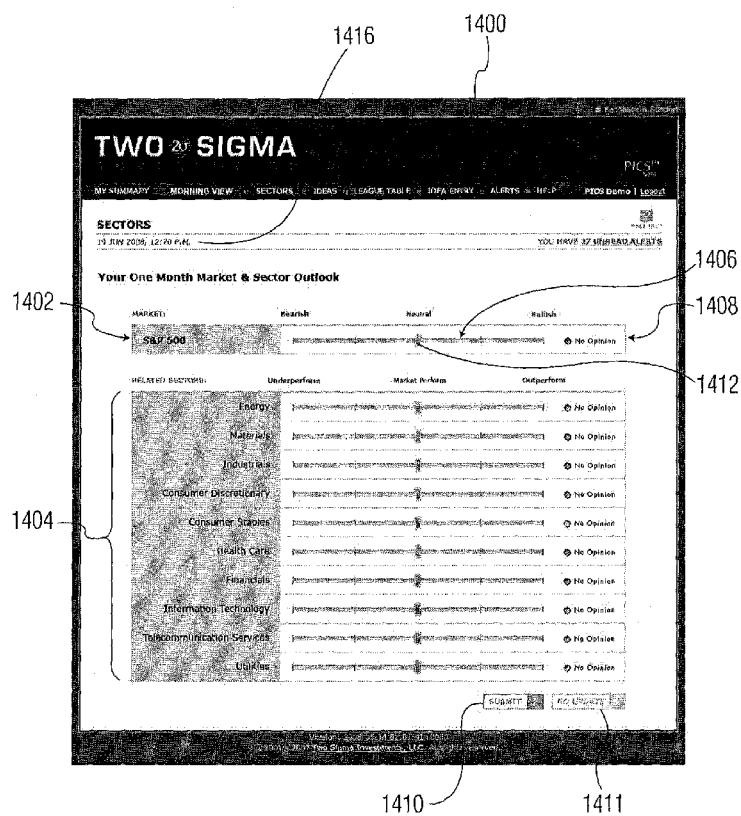
FIGS. 14A, 14B and 14C are examples of industry sector-wide sentiment selection screen layouts, according to embodiments of the present invention.
Figure 14B:
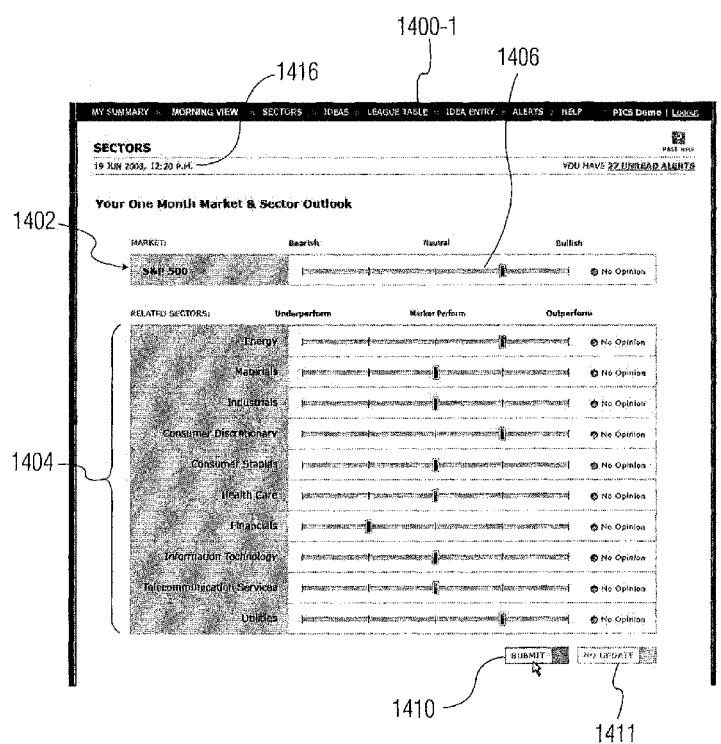
Figure 14C:
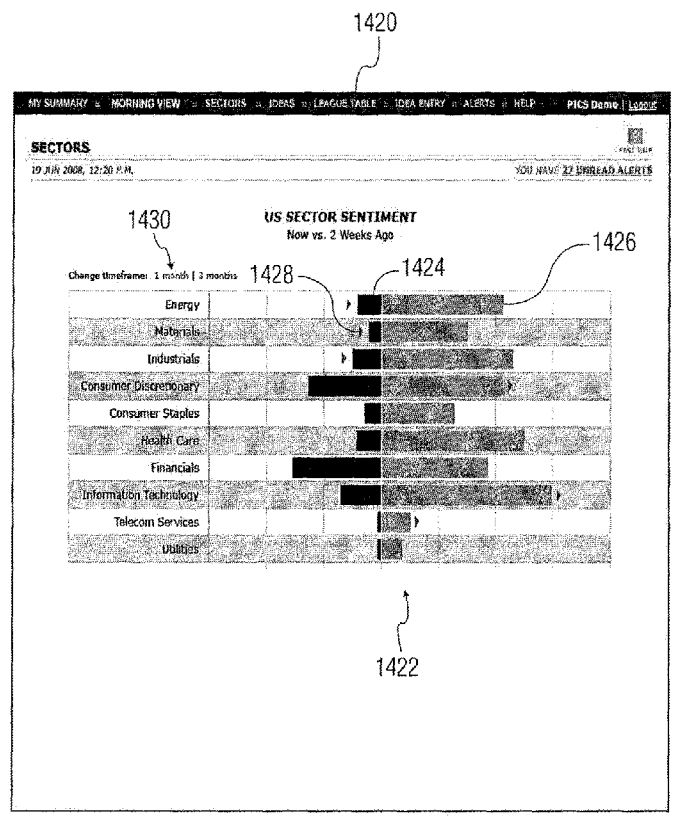

Referring back to FIG. 1, in addition to entering, amending and closing ideas, online platform 126 may include features useful for generating ideas, such as an idea vetting interface 128 represented by idea vetting screen layouts 1300, 1300-1, 1300-2 (respective FIGS. 13A-13C) and a sector-wide sentiment interface 130 represented by sector-wide sentiment screen layouts 1400, 1400-1, 1420 (FIGS. 14A-14C). Each of idea vetting interface 128 and sector-wide sentiment interface 130 may communicate with portfolio tracking system 106. In particular, idea vetting interface 128 and sector-wide sentiment interface 130 may each receive normalized ideas stored in memory 114 for a group of contributors. Idea vetting interface 128 may form aggregate normalized idea parameters for a particular security, by combining the normalized idea parameters for the group of contributors. Sector-wide sentiment interface 130 may form sentiments for a number of sectors (e.g., the energy sector, the healthcare sector, the information technology sector, etc.) by 1) separating the normalized idea parameters for the group of contributors by sector and 2) combining the sector-separated normalized idea parameters for the group of contributors.

The idea vetting interface 128 may provide information on the overnight movement of one or more securities, as well as indicators representing aggregate normalized idea parameters (e.g., stored in memory 114) for a number of contributors 102. The sector-wide sentiment interface 130 may provide an overall sentiment regarding different sectors of a market (e.g., the energy sector, the health care sector, etc.) over a period of time, based on the normalized ideas (e.g., stored in memory 114) for a number of contributors 102. In addition, the sector-wide sentiment interface 130 may provide an individual contributor with an updatable record of a market and sector outlook for a time period. Both the idea vetting indicators for individual securities and the sector-wide sentiments may be useful to generate new ideas or to manage previously entered ideas.

FIGS. 13A, 13B and 13C are examples of idea vetter selection screen layouts for idea vetting interface 128 (FIG. 1), according to embodiments of the present invention. In particular, FIG. 13A is an initial idea vetting screen layout 1300 for initially entering a ticker symbol representing a security and a direction for the security; FIG. 13B is an idea vetting screen layout 1300-1 after one set of indicators 1306 is determined for a security; and FIG. 13C is an idea vetting screen layout 1300-2 after three sets of indicators 1306-1, 1306-2, 1306-3 are determined for three different securities.

The idea vetting interface 128 (FIG. 1) uses indicators based on aggregate normalized idea data from a group of contributors 102 as well as any overnight changes in securities to provide initial morning information that may be useful in the generation of ideas for the day's trading. The idea vetting interface 128 may be useful to vet morning call securities, to manage open ideas and to research new ideas. The idea vetting interface 128 may be used to track any changes in a security that occurred overnight and to provide insight into a sell side sentiment of a security (e.g., to determine how widespread a call extends on a particular security).

As shown in FIG. 13A, initial idea vetting screen layout 1300 provides a ticker symbol entry 1302 for entering a ticker symbol representing a security and a direction for the security and direction indicators 1304 for selecting a proposed direction for the security. The information in ticker symbol entry 1302 and direction indicators 1304 that is provided by the individual contributor is used to produce a contributor-generated sentiment (for the individual user) as well as to determine indicators for the security based on a group of contributors and any overnight changes to the security. After the information is provided in ticker symbol entry 1302 and direction indicators 1304 for the security, idea vetting screen layout 1300-1 (FIG. 13A) is displayed. It is understood that data entry into initial idea vetting screen layout 1300 (as well as screen layouts 1300-1, 1300-2) may be provided by keystroke input and/or by input via a pointing device.

Idea vetting screen layout 1300-1 includes a set of indicators 1306 and contributor-generated sentiment 1308. Idea vetting screen layout 1300-1 also includes ticker symbol entry 1302 and direction indicators 1304 for producing indicators for additional securities. Set of indicators 1306 represents the determined aggregate normalized idea parameters for a group of contributors. Contributor-generated sentiment 1308, in contrast, represents the proposed sentiment for a security that is indicated by the individual contributor in ticker symbol entry 1302 and direction indicators 1304.

Set of indicators 1306 may include sentiment indicator 1310, conviction indicator 1312, dispersion indicator 1314 and sector sentiment indicator 1316. Sentiment indicator 1310 represents a momentum direction (e.g., positive or negative) and a sentiment (e.g., between bearish and bullish) of a security, for the group of contributors. Conviction indicator 1312 represents a strength of conviction for the security (e.g., between medium and very strong), for the group of contributors. It is contemplated that conviction indicator 1312 may be represented by two graphs, including one graph for long conviction strength and one graph for short conviction strength. Dispersion indicator 1314 represents how widely held the stock is for the group of contributors. Sector sentiment indicator 1316 represents the associated sector sentiment for the security, the long and short sentiments (and sentiment movements) for that sector, among the group of contributors.

It is understood that set of indicators 1306 may include any other suitable indictors. Each of indicators 1310, 1312, 1314, 1316 may be provided as suitable graphical displays, such as meters (e.g., sentiment indicator 1310), intensity graphs (e.g., conviction indicator 1310), bar graphs (e.g., sector sentiment indicator 1316), etc. It is understood that indicators 1310, 1312, 1314, 1316 are not limited to the graphical displays shown in FIG. 1300-1. It is contemplated that any of indicators 1310, 1312, 1314, 1316 may be presented as a suitable text display.

Contributor-generated sentiment 1308 may include a link 1318 allowing the individual to add an idea (described above), based on set of indicators 1306. Contributor-generated sentiment 1308 may be indicated as being separate from set of indicators 1306. For example, a box may be drawn around contributor-generated sentiment 1308 and/or a title may be provided relative to set of indicators 1306 (or contributor-generated sentiment 1308).

Additional securities may be selected for vetting, using ticker symbol entry 1302 and direction indicators 1304 on idea vetting screen layout 1300-1 such that indicators for multiple securities may be presented. For example, as shown in FIG. 13C, idea vetting screen layout 1300-2 includes sets of indicators 1306-1, 1306-2, 1306-3 for respective contributor-generated sentiments 1308-1, 1308-2, 1308-3. It is understood that idea vetting screen layout 1300-2 may provide presentation of a predetermined number of securities and associated set of indicators 1306.

Figure 12:
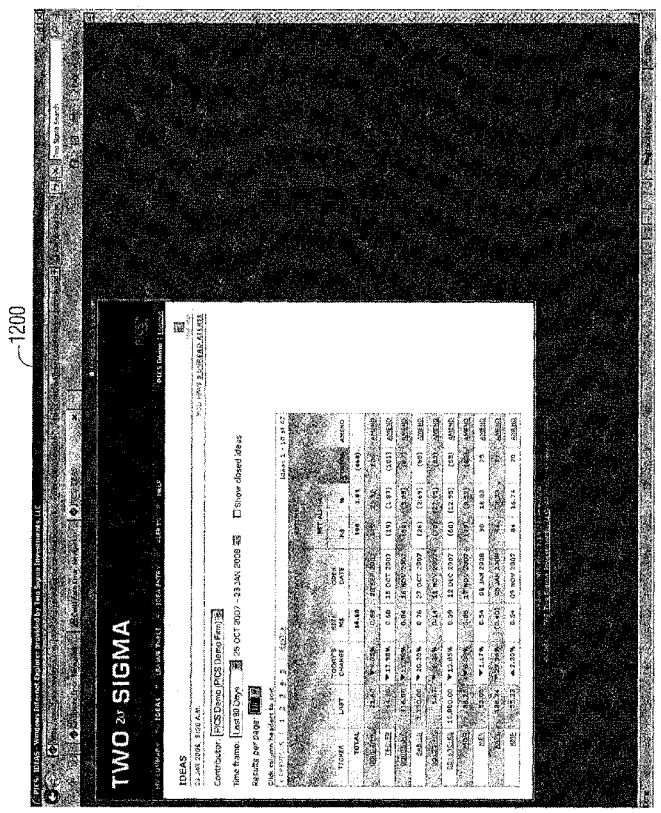
FIG. 12 is an example of a screen layout for viewing ideas, according to an embodiment of the present invention.

Because idea vetting screen layouts 1300, 1300-1 may be used for morning generation of ideas, it is contemplated that a predetermined time limit may be provided for entry of securities into screen layouts 1300, 1300-1. According to another embodiment, idea vetting screen layout 1300-1 may be cleared after a predetermined time period. Idea vetting screen layout 1300-1 may determine sets of indicators 1306 for up to a predetermined number of securities. It is understood that contributor-generated sentiment(s) 1308 and set(s) of indicators 1306 shown on idea vetting screen layouts 1300-1, 1300-2 may be provided as part of idea screen layout 1200 (FIG. 12).

Referring to FIGS. 14A, 14B and 14C, examples of sector-wide sentiment screen layouts for sector-wide sentiment interface 130 (FIG. 1) are shown, according to embodiments of the present invention. In particular, FIG. 14A is an initial market/sector outlook screen layout 1400 for initially entering market and sector outlooks by an individual contributor; FIG. 14B is a market/sector outlook screen layout 1400-1 after market and sector outlooks have been indicated by the individual contributor; and FIG. 14C is a sector sentiment screen layout 1420 after three sets of indicators 1306-1, 1306-2, 1306-3 are determined for three different securities.

As shown in FIG. 14A, initial market/sector outlook screen layout 1400 includes market outlook indicator 1402 and sector outlook indicators 1404. Market outlook indicator 1402 and sector outlook indicators 1404 each include a slider indicator 1406 having slider 1412 to indicate an outlook. Market outlook indicator 1402 and sector outlook indicators 1404 also include a no opinion region 1408 for indicating "no opinion" regarding an outlook. Market outlook indicator 1402 may include graduated selections for bearish, neutral and bullish outlooks. Market outlook indicator 1404 may include graduated selections for underperform, market perform and outperform outlooks.

Initial market/sector outlook screen layout 1400 also includes an outlook submission region 1410 for submitting a market and sector outlooks selected via respective slider indictors 1406 and no opinion regions 1408. Outlook screen layout 1400 also includes an outlook indication time 1416 which indicates a time for generating an initial market/sector outlook or an updated market/sector outlook. FIG. 14B illustrates a market/sector outlook screen layout 1400-1 after market and sector outlooks have been selected by the individual contributor via slider indictors 1406.

The selected market/outlook shown in FIG. 14B represents an updatable record of the market and sector outlooks by the individual contributor for a predetermined time period. In an exemplary embodiment, the time period is a month. It is understood that the time period may include, but is not limited to, three months, six months or twelve months. After the time period has expired, the market sector outlook may be reset to initial market/sector outlook screen layout 1400 (FIG. 14A). It is contemplated that a message may also be indicated on initial market/sector outlook screen layout 1400 indicating that that time period has expired and that that market/sector outlook has been reset. Market/sector outlook screen may also include no update region 1411 for reviewing sector sentiment screen layout 1420 (FIG. 14C) without updating the market/sector outlook screen layout 1400-1.

As well as providing a market/sector outlook for an individual contributor (via market/sector outlook screen layout 1400-1), sector sentiment screen layout 1420, shown in FIG. 14C, provides an overall sentiment indicator 1422 regarding different sectors of the market for a group of contributors. Overall sentiment indicator 1422 represents a change in sector sentiments over a timeframe (e.g., two weeks) for a group of contributors based on their corresponding normalized ideas (which may include one or more normalized ideas per contributor). Overall sentiment indicator 1422, however, does not include the market/sector outlook generated by the individual contributor in market/sector outlook screen layout 1400-1 (FIG. 14B).

Overall sentiment indicator 1422 may include a short side indicator 1424, a long side indicator 1426 and direction indicators 1428 for the different sectors. As discussed above, overall sentiment indicator 1422 represents a change in sector sentiment for a predetermined time frame. Sector sentiment screen layout 1420 also includes a timeframe selector 1430 to change the timeframe for the overall sentiment indicator 1422. Although timeframes of two weeks, one month and three months are illustrated in FIG. 14C, it is understood that any suitable timeframe for viewing a change in overall sector sentiment for a group of contributors may be selected. Although United States (U.S.) market sectors are illustrated in FIG. 14C, it is understood that other market sector sentiments may be determined, for example, for Japan, Europe, etc.

Overall sentiment indicator 1422 may be represented by bar graphs, as shown in FIG. 14C, that include a relative magnitude for short sentiments 1424 and long sentiments 1426. It is understood that the illustration of bar graphs in FIG. 14C is not meant to be limiting. For example, short sentiments 1424 and long sentiments 1426 may be presented as two parallel bar graphs. In addition, although bar graphs are illustrated in FIG. 14C with a magnitude relative to a horizontal direction, it is understood that the bar graphs may be presented relative to a vertical direction. Furthermore, it is understood that indications of a change in sector sentiment may be represented by any other suitable graphical display and/or textual display.

Figure 15:
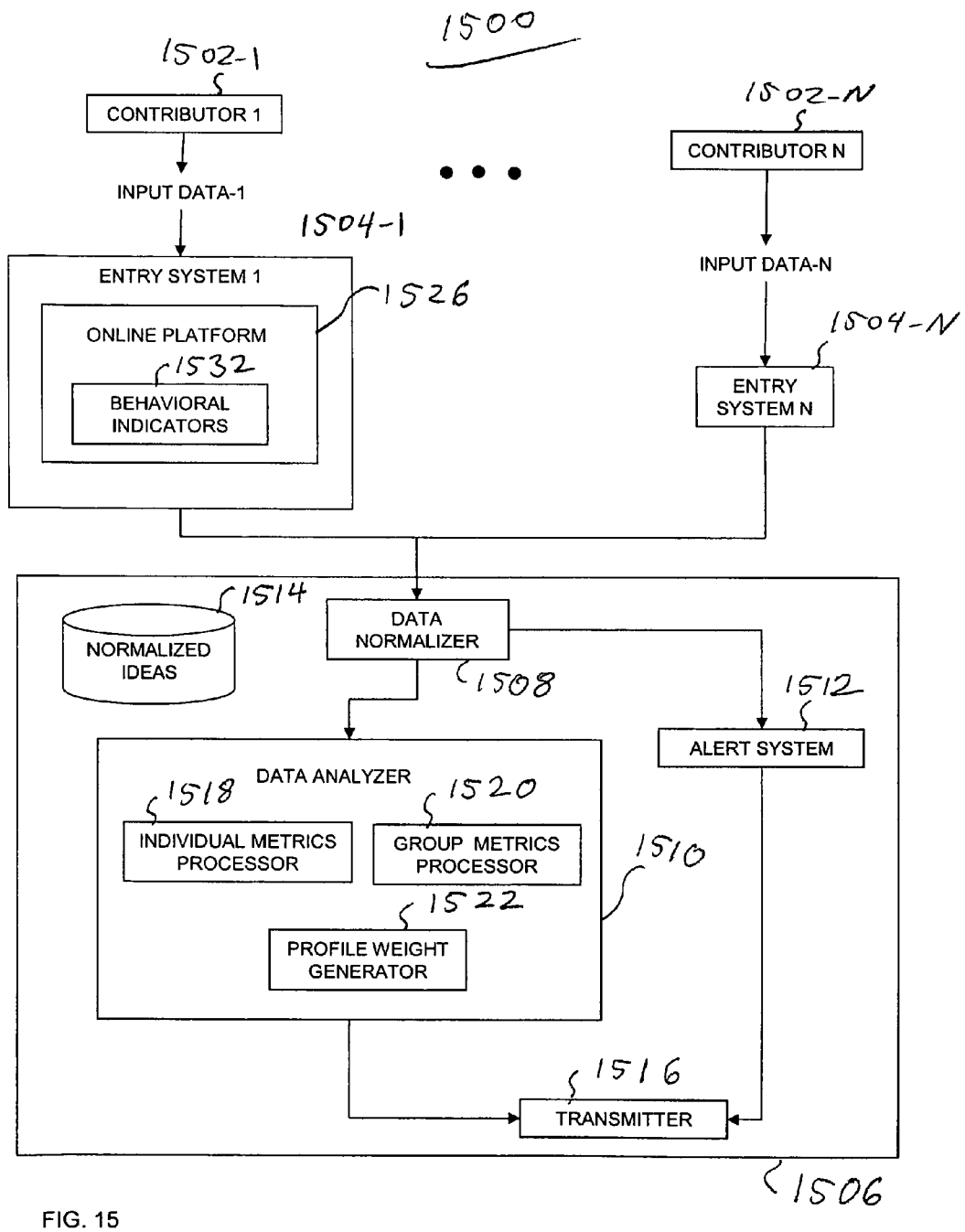
FIG. 15 is a block diagram of an exemplary apparatus for processing data, according to an embodiment of the present invention.

Referring to FIG. 15, an apparatus 1500 for processing data is shown, according to an embodiment of the present invention. Apparatus 1500 is similar to apparatus 100 (FIG. 1) except that apparatus 1500 relates to processing any suitable data, as described above. Apparatus 1500 includes a plurality of entry systems 1504-1, ..., 1504-N and tracking system 1506. As described above, each different contributor 1502-1, ..., 1502-N provides respective input data based on a set of ideas relating to data, to different respective entry systems 1504-1, ..., 1504-N, where each entry system 1504 receives the set of ideas in respectively different ways.

Tracking system 1506, thus, receives the set of ideas from each contributor 1502 in the form of data formulated according to the corresponding entry system 1504 and functions as a comparator to perform at least one comparison of the data from entry systems 1504 and to signal results of the comparison. Tracking system 1506 includes data normalizer 1508 that normalizes the differently formatted data from each different contributor 1502 into a common format. Tracking system 1506, thus, determines normalized ideas that reflect the set of ideas of each contributor 1502.

Tracking system 1506 includes data normalizer 1508, data analyzer 1510, memory 1514, alert system 1512 and transmitter 1516. Normalized ideas may be determined by data normalizer 1508, analyzed by data analyzer 1510 and provided to respective entry system 1504 via transmitter 1516 (coupling between transmitter 1516 and entry systems 1504 not shown). Accordingly, data analyzer 1510 compares the data from different contributors, after being normalized, and the results of the comparison may be provided to at least one of the contributors via entry system 1504. Users of tracking system 1506 may review data of individual contributors, as well as groups of contributors, based on the normalized ideas. Alert system 1512 is similar to alert system 118 (FIG. 1) except that alert system 1512 may use current (i.e. real-time) data values, historical data values, as well as aggregate information from the group of contributors to execute instructions to signal at least one of the contributors 1502 relating to an alert.

Data analyzer 1510 is similar to data analyzer 116 (FIG. 3), except that data analyzer 1510 may be used to process normalized data. Data analyzer 1510 may include an individual metrics processor 1518 to determine an individual metric associated with each contributor 1502 and a group metrics processor 1520 to normalize the individual metric relative to a group metric associated with the group of contributors 1502. Data analyzer 1510 may also include profile weight generator that may weight the individual metric or normalized metric with a predetermined weighting profile. Although not shown, data analyzer may also apply further weighting and/or results filtering of the individual metric or normalized metrics, as described above.

At least one entry system 102 may include online platform 1526 that allows a contributor 1502 to enter ideas, amend ideas, close ideas, review ideas and confirm different actions regarding ideas (e.g., confirm the closing of an idea), as described above. In addition, online platform 1526 may include one or more behavioral indicators interfaces 1526. Interface 1526 may allow a contributor 1502 to provide input on data, for example, a sentiment regarding the data. Interface 1526 may also allow the contributor to review the aggregated sentiments for the group of contributors 1502, as described above.

Thus, as used herein, the phrase "financial data" refers to data relating to transactions with financial instruments; data relating to asset classes; data relating to the performance of individual contributors; data relating to one or more markets, including market sectors; data relating to geopolitical events, data relating to macroeconomic events; modeling of data (financial or non-financial); or opinions (or sentiments) of individuals relating to data (financial or non-financial). The phrase "stock," as used herein, refers to stocks, futures, currencies, bonds, options, securities and sell side analysis.

Although the invention has been described in terms of systems and methods for processing data, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in tangible computer readable media for execution by the computer.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. Apparatus for processing data, said apparatus comprising:
    a plurality of entry systems for receiving from each of a plurality of contributors a respective plurality of communications relating to trading of financial instruments, wherein said plurality of contributors each trade financial instruments independently of each other,
    a data normalizer for normalizing said communications received from each of said plurality of contributors in order to obtain a respective plurality of normalized communications for each of said contributors, wherein said normalized communications for said plurality of contributors has a common format,
    a tracking system for
        a) measuring, over a common period of time and using a microprocessor, respective gains associated with buying and selling said financial instruments based on said normalized communications for each respective one of said contributors,
        b) providing a comparison of 1) said respective gains over said common period of time for said one of said contributors based on said normalized communications from said one of said contributors, with 2) said respective gains over said common period of time for others of said contributors based on said normalized communications for said others of said contributors over said common period of time.

2. Apparatus according to claim 1, wherein each entry system receives said data in respectively different ways.

3. Apparatus according to claim 1, wherein said communications also relates to one or more of communications relating to transactions with financial instruments, communications relating to asset classes, communications relating to a performance of each contributor, communications relating to financial markets, communications relating to financial market sectors, communications relating to geopolitical events, communications relating to macroeconomic events, communications relating to models and communications relating to sentiments.

4. Apparatus according to claim 1, further including a transmitter for signaling at least one of said contributors when execution of instructions corresponding to at least a portion of said communication achieves at least one result.

5. Apparatus according to claim 4, wherein said instructions include at least one of a static alert associated with at least one of said contributors and based on current data values, a dynamic alert associated with at least one of said contributors and based on historical data values or a further alert based on aggregate results determined by the tracking system for the plurality of contributors.

6. Apparatus according to claim 4, wherein said transmitter is signaled by said at least one of said contributors to recognize said at least one result.

7. Apparatus according to claim 1, wherein at least one of said entry systems includes an online platform configured to provide entry of said input data associated with said corresponding data and to provide management of said normalized data received from said tracking system.

8. Apparatus according to claim 7, wherein said online platform includes:
an interface configured to receive the normalized communications from the tracking system for the plurality of contributors and to determine a set of indicators associated with the communications, the interface determining said set of indicators by aggregating sentiment parameters from the received normalized communications for the plurality of contributors corresponding to each indicator.

9. Apparatus according to claim 7, wherein said communications includes parameters relating to at least one of market sectors or financial instruments and said online platform is configured to provide presentation of said set of indicators associated with the at least one of the market sectors or the financial instruments.

10. Apparatus according to claim 1, wherein the tracking system includes a normalization adjuster coupled to the data normalizer, the normalization adjuster configured to adjust the normalized communications based on historical data values.

11. Apparatus according to claim 1, further comprising:
a data analyzer configured to compare said normalized communications from ones of said contributors, received from said data normalizer, and provide results of said comparison to at least one of said contributors.

12. Apparatus according to claim 11, further comprising:
a results filter configured to filter the results of said comparison with a predetermined filter to modify a presentation of said results.

13. Apparatus according to claim 11, said data analyzer further comprising:
an individual metrics processor configured to determine an individual metric for each contributor based on historical data values, using the respective normalized data received from said communications normalizer; and
a group metrics processor coupled to the individual metrics processor and configured to normalize the individual metric of each contributor relative to a group metric of the plurality of contributors.

14. Apparatus according to claim 13, wherein the communications includes parameters relating to transactions with financial instruments and said individual metric includes at least one of a net return, a gross return, an alpha return, a Sharpe ratio, a frequency of providing respective new data or an accuracy of the corresponding transaction using the associated normalized data.

15. Apparatus according to claim 13, said data analyzer further comprising:
a profile weight generator configured to receive the individual metric or the normalized metric from each contributor and to apply a predetermined weighting profile to said individual metric or said normalized metric to form a weighted metric.

16. Apparatus according to claim 15, further comprising:
a points generator coupled to the profile weight generator and configured to determine an aggregate point score for the plurality of contributors based on the received weighted metric.

17. Apparatus for processing data according to claim 1, said apparatus further including
an alert system configured to indicate at least one of a static alert, a dynamic alert and a further alert to one or more of the contributors,
wherein the static alert is associated with at least one of said contributors and based on current data values associated with the communications,
the dynamic alert is associated with at least one of said contributors and based on historical data values associated with the communications, and
the further alert is based on aggregate results determined by the data analyzer for the plurality of contributors.

18. Apparatus according to claim 17, wherein each entry system receives said communications in respectively different ways and the tracking system normalizes said communications received from each of said plurality of contributors into a common format.

19. Apparatus according to claim 17, wherein said data analyzer is configured to determine an individual metric for each contributor based on historical data values, using the respective communications and to normalize the individual metric of each contributor relative to a group metric of the plurality of contributors.

20. Apparatus according to claim 17, wherein said alert system further includes:
a static alert detector configured to set a static alert flag, for each contributor, by comparing the corresponding received data associated with the communications, the current data values associated with the communications and predetermined static alerts,
wherein the static alert flag indicates the static alert.

21. Apparatus according to claim 17, wherein said alert system further includes:
a dynamic alert detector configured to set a dynamic alert flag, for each contributor, by comparing the corresponding received data associated with the communications, the current data values associated with the communications, the predetermined static alerts, the historical data values and predetermined dynamic alerts,
wherein the dynamic alert flag indicates the dynamic alert.

22. Apparatus according to claim 17, wherein said alert system further includes:
a further alert detector configured to set a further alert flag, for the plurality of contributors, by comparing the corresponding received data, the current data values associated with the communications, the predetermined static alerts, the historical data values associated with the communications, the predetermined dynamic alerts and the aggregate results,
wherein the further alert flag indicates the further alert.

23. Apparatus according to claim 17, wherein said alert system further includes:
an alert engine configured to receive a static alert flag associated with the static alert, a dynamic alert flag associated with the dynamic alert and a further alert flag associated with the further alert and to determine whether at least one of the static alert flag, the dynamic alert flag and the further alert flag indicates that a corresponding alert is detected, said alert engine configured to transmit the detected alert to the one or more contributors.

24. A method for processing data, said method comprising:
   receiving from each of a plurality of contributors a respective plurality of communications relating to trading of financial instruments, wherein said plurality of contributors each trade financial instruments independently of each other
   normalizing said communications received from each of said plurality of contributors in order to obtain normalized communications for each of said contributors, wherein said normalized communications for said plurality of contributors has a common format;
   measuring, over a common period of time and using a microprocessor, respective gains associated with buying and selling said financial instruments based on said normalized communications for each respective one of said contributors,
   providing a comparison of 1) said respective gains over said common period of time for said one of said contributors based on said normalized communications from said one of said contributors, with 2) said respective gains over said common period of time for others of said contributors based on said normalized communications for said others of said contributors over said common period of time.

25. The method according to claim 24, wherein said communications also relates to communications relating to asset classes, communications relating to a performance of each contributor, communications relating to financial markets, communications relating to financial market sectors, communications relating to geopolitical events, communications relating to macroeconomic events, communications relating to models and communications relating to sentiments.

26. The method according to claim 24, said method further including:
   indicating instructions corresponding to at least one of a static alert associated with at least one of said contributors and based on current data values associated with the communications, a dynamic alert associated with at least one of said contributors and based on historical data values associated with the communications or a further alert based on aggregate results determined based on said at least one comparison for the plurality of contributors.

27. The method according to claim 24, the step of normalizing said communications including adjusting the normalized communications based on historical data values associated with the communications, the adjusted communications being used to perform said at least one comparison.

28. The method according to claim 24, the method further including:
   filtering the results of said comparison with a predetermined filter to modify a presentation of said results.

29. The method according to claim 24, the performing of the at least one comparison further including:
   determining an individual metric for each contributor based on historical data values associated with the communications, using the respective normalized communications; and
   normalizing the individual metric of each contributor relative to a group metric of the plurality of contributors.

30. The method according to claim 29, wherein the communications includes parameters relating to transactions with financial instruments and said performance metric includes at least one of a net return, a gross return, an alpha return, a Sharpe ratio, a frequency of providing respective new data or an accuracy of the corresponding transaction using the associated normalized communications.

31. The method according to claim 29, the performing of the at least one comparison further including:
   applying a predetermined weighting profile to said individual metric or to said normalized metric, to form a weighted metric.

32. The method according to claim 31, the performing of the at least one comparison further comprising:
   determining an aggregate point score for the plurality of contributors based on the received weighted metric.

33. A method for processing data, said method comprising:
   receiving from each of a plurality of contributors a respective plurality of communications relating to trading of financial instruments, wherein said plurality of contributors each trade financial instruments independently of each other,
   normalizing said communications received from each of said plurality of contributors in order to obtain a respective plurality of normalized communications for each of said contributors, wherein said normalized communications for said plurality of contributors has a common format,
   measuring, over a common period of time and using a microprocessor, respective gains associated with buying and selling said financial instruments based on said normalized communications for each respective one of said contributors over a period of time,
   and
   providing a comparison of 1) said respective gains over said common period of time for said one of said contributors based on said normalized communications from said one of said contributors, with 2) said respective gains over said common period of time for others of said contributors based on said normalized communications for said other of said contributors over said common period of time; and
   indicating an alert including at least one of a static alert, a dynamic alert and a further alert to one or more of the contributors,
   wherein the static alert is associated with at least one of said contributors and based on current data values associated with the communications,
   the dynamic alert is associated with at least one of said contributors and based on historical data values associated with the communications, and
   the further alert is based on aggregate results determined based on said at least one comparison for the plurality of contributors.

34. The method according to claim 33, the indicating of said alert including:
   setting a status of a static alert flag, for each contributor, by comparing the corresponding received communications, the current data values associated with the communications and predetermined static alerts,
   setting a status of a dynamic alert flag, for each contributor, by comparing the corresponding received communications, the current data values associated with the communications, the predetermined static alerts, the historical data values associated with the communications and predetermined dynamic alerts; and
   setting a status of a further alert flag, for the plurality of contributors, by comparing the corresponding received communications, the current data values associated with the communications, the predetermined static alerts, the historical data values associated with the communications, the predetermined dynamic alerts and the aggregate results.

35. The method according to claim 34, the indicating of said alert including:
    detecting the alert based on the respective status of each of the static alert flag, the dynamic alert flag and the further alert flag; and
    transmitting the detected alert to the one or more contributors.

36. Apparatus for processing data according to claim 1, wherein said tracking system further compares said respective gains over said common period of time based on said normalized communications for said financial instruments for each of said contributors.

37. Apparatus for processing data according to claim 1, wherein said tracking system further provides access from a common location to said normalized communications from each of said contributors, wherein said normalized communications includes which of said financial instruments each of said contributors traded over said common period of time.

38. A method for processing data according to claim 33, further comprising the step of comparing said respective gains over said common period of time.

39. A method for processing data according to claim 24, further comprising the step of comparing said respective gains over said common period of time based on said normalized communications for said financial instruments for each of said contributors.

40. A method for processing data according to claim 24, further comprising the step of providing access from a common location to said normalized communications from each of said contributors, wherein said normalized communications includes which of said financial instruments each of said contributors traded over said common period of time.

41. Apparatus for processing data according to claim 1, wherein said tracking system further compares said respective gains over said common period of time based on said normalized communications for said financial instruments for each of said contributors.

42. Apparatus for processing data according to claim 1, wherein said tracking system further provides access from a common location to said normalized communications from each of said contributors, wherein said normalized communications includes which of said financial instruments each of said contributors traded over said common period of time.

* * * * *